US011978271B1

(12) United States Patent
Kharbanda et al.

(10) Patent No.: US 11,978,271 B1
(45) Date of Patent: May 7, 2024

(54) INSTANCE LEVEL SCENE RECOGNITION WITH A VISION LANGUAGE MODEL

(71) Applicant: Google LLC, Mountain View, CA (US)

(72) Inventors: Harshit Kharbanda, Pleasanton, CA (US); Boris Bluntschli, Canton of Zurich (CH); Vibhuti Mahajan, Los Angeles, CA (US); Louis Wang, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/496,402

(22) Filed: Oct. 27, 2023

(51) Int. Cl.
  *G06V 20/70* (2022.01)
  *G06V 10/764* (2022.01)
  *G06V 20/40* (2022.01)
(52) U.S. Cl.
  CPC ............ *G06V 20/70* (2022.01); *G06V 10/764* (2022.01); *G06V 20/41* (2022.01)
(58) Field of Classification Search
  CPC ....... G06V 20/70; G06V 20/41; G06V 10/764
  See application file for complete search history.

(56) References Cited

U.S. PATENT DOCUMENTS

| 9,171,352 B1 * | 10/2015 | Raynaud .............. G06V 10/772 |
| 2015/0178322 A1 * | 6/2015 | Smietanka .......... G06F 16/5866 707/772 |
| 2017/0084067 A1 * | 3/2017 | Son .......................... G06T 11/60 |
| 2022/0035514 A1 * | 2/2022 | Shin .................... G06F 3/04883 |
| 2023/0162481 A1 * | 5/2023 | Yuan ........................ G06T 9/00 382/159 |
| 2023/0386646 A1 * | 11/2023 | Tanwani ................ G16H 30/40 |
| 2023/0394855 A1 * | 12/2023 | Xie ......................... G06F 40/40 |

OTHER PUBLICATIONS

Zhang, Yifan, et al. "A Fine-Grained Image Description Generation Method Based on Joint Objectives." arXiv preprint arXiv: 2311. 12799 (2023). (Year: 2023).*
Shao, Mengyue, et al. "Fine-Grained Features for Image Captioning." Computers, Materials & Continua 75.3 (2023). (Year: 2023).*

* cited by examiner

*Primary Examiner* — Utpal D Shah
(74) *Attorney, Agent, or Firm* — DORITY & MANNING P.A.

(57) ABSTRACT

Systems and methods for image understanding can include one or more object recognition systems and one or more vision language models to generate an augmented language output that can be both scene-aware and object-aware. The systems and methods can process an input image with an object recognition model to generate an object recognition output descriptive of identification details for an object depicted in the input image. The systems and methods can include processing the input image with a vision language model to generate a language output descriptive of a predicted scene description. The object recognition output can then be utilized to augment the language output to generate an augmented language output that includes the scene understanding of the language output with the specificity of the object recognition output.

20 Claims, 13 Drawing Sheets

Object:
- is_whole: true
- description: "white humidifier on a white background"
- fine_entity: QLX Drip XA-Q2
- fine_entity: QLX Drip humidifier
- title Qax Cool-Mist humidifier, 1 Gal. - Clear & White
- ocr: QLX Object: Drop Cool-Mist humidifier, 1 Gal. - Clear & White
- is_selected: true
- fine_entity: QLX Drip XA-Q2
- fine_entity: QLX Drip humidifier
- title Qax Cool-Mist humidifier, 1 Gal. - Clear & White
- ocr: QLX

454

This image is about a white humidifier on a white background. It is about QLX Drip XA-Q2 or QLX Drip humidifier. Image comes from a page with title "Qax Cool-Mist humidifier, 1 Gal. - Clear & White".

Text on the image says: QLX

456

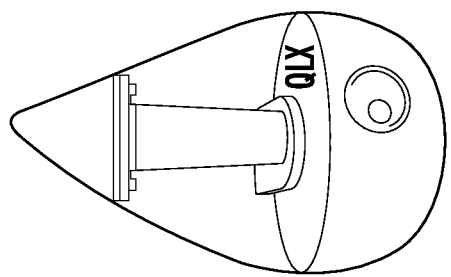

452

Query: "what's it use"
MCE: "What is the use of QLX Drip humidifier"

602 — Today is <date>. A user is providing an image and asking a question in <location> and at <time>. Answer the query factually and appropriately.

604 —
[WIO] This image is about <wio.description>. It shows <wio.coarse_entity>. It could be <wio.fine_entity>. It comes from a page with title <wio.exact_match_result.title>.

[SO if SO!=WIO] The intent for this image is about <so.coarse_entity>. It could be <so.fine_entity>. It comes from a page with title <so.exact_match_result.title>. Text on it says <so.text>.

[OO] The image additionally shows the following objects prominently:
Object 1 <obj.coarse_entity>. It could be <obj.fine_entity>. It comes from a page with title <obj.exact_match_result.title>. Text on it says <obj.text>.
// Repeat for Object 2,3,4...

[WIO] Text on the image says <wio.text>.

606 — The user query is <multimodal text query>.

*WIO= Whole Image Object; SO = Selected Object; OO = Other Objects

FIG. 6A

INSTANCE LEVEL SCENE RECOGNITION WITH A VISION LANGUAGE MODEL

FIELD

The present disclosure relates generally to vision language model output augmentation based on instance-level object recognition. More particularly, the present disclosure relates to leveraging vision language model processing with object recognition processing to generate a detailed output that can be utilized for search result determination and/or generative model content generation.

BACKGROUND

Understanding the world at large can be difficult. Whether an individual is trying to understand what the object in front of them is, trying to determine where else the object can be found, and/or trying to determine where an image on the internet was captured from, text searching alone can be difficult. In particular, users may struggle to determine which words to use. Additionally, the words may not be descriptive enough and/or abundant enough to generate desired results.

In addition, the content being requested by the user may not be readily available to the user based on the user not knowing where to search, based on the storage location of the content, and/or based on the content not existing. The user may be requesting search results based on an imagined concept without a clear way to express the imagined concept.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include obtaining, by a computing system including one or more processors, image data. The image data can include an input image. The method can include processing, by the computing system, the input image with an object recognition model to generate a fine-grained object recognition output. The fine-grained object recognition output can be descriptive of identification details for an object depicted in the input image. The method can include processing, by the computing system, the input image with a vision language model to generate a language output. The language output can include a set of predicted words predicted to be descriptive of the input image. In some implementations, the set of predicted words can include a coarse-grained term descriptive of predicted identification of the object depicted in the input image. The method can include processing, by the computing system, the fine-grained object recognition output and the language output to generate an augmented language output. The augmented language output can include the set of predicted words with the coarse-grained term replaced with the fine-grained object recognition output.

In some implementations, processing, by the computing system, the input image with the object recognition model to generate the fine-grained object recognition output can include detecting the object in the input image, generating an object embedding, determining an image cluster associated with the object embedding, and processing web resources associated with the image cluster to determine identification details for the object. Generating the object embedding can include generating a bounding box associated with a position of the object within the input image, generating an image segment based on the bounding box, and processing the image segment with an embedding model to generate the object embedding.

In some implementations, processing, by the computing system, the fine-grained object recognition output and the language output to generate the augmented language output can include processing, by the computing system, the language output to determine a plurality of text tokens associated with features in the input image, determining, by the computing system, a particular token of the plurality of text tokens is associated with the object, and replacing, by the computing system, the particular token with the fine-grained object recognition output. Determining, by the computing system, the particular token of the plurality of text tokens is associated with the object can include processing, by the computing system, the fine-grained object recognition output with an embedding model to generate an instance-level embedding, processing, by the computing system, the plurality of text tokens with the embedding model to generate a plurality of token embeddings, and determining, by the computing system, the instance-level embedding is associated with a particular embedding associated with the particular token.

In some implementations, the method can include processing, by the computing system, the augmented language output with a second language model to generate a natural language response to the augmented language output. The natural language response can include additional information associated with the augmented language output. The coarse-grained term can include an object type. The fine-grained object recognition output can include a detailed identification of the object. In some implementations, the method can include providing, by the computing system, the augmented language output in an augmented-reality experience. The augmented-reality experience can include the augmented language output overlayed over a live video feed of an environment.

Another example aspect of the present disclosure is directed to a computing system for image captioning. The system can include one or more processors and one or more non-transitory computer-readable media that collectively store instructions that, when executed by the one or more processors, cause the computing system to perform operations. The operations can include obtaining image data. The image data can include an input image. The operations can include processing the input image with an object recognition model to generate an object recognition output. The object recognition output can be descriptive of identification details for an object depicted in the input image. The operations can include processing the input image with a vision language model to generate a language output. The language output can include a set of words predicted to be descriptive of the input image. In some implementations, the set of words can include a term descriptive of predicted identification of the object depicted in the input image. The operations can include processing the object recognition output and the language output with the vision language model to generate an augmented language output. The augmented language output can include the set of words with the term replaced with the object recognition output.

In some implementations, the input image can be descriptive of the object in an environment with one or more additional objects. The object recognition output can be associated with the object. The language output can be associated with the object and the environment with the one or more additional objects. The vision language model may have been trained on a training dataset including a plurality of image-caption pairs. The plurality of image-caption pairs can include a plurality of training images and a plurality of respective captions associated with the plurality of training images. The input image can be processed with the object recognition model and the vision language model in parallel to perform parallel determination of the object recognition output and the language output. The vision language model can include one or more text encoders, one or more image encoders, and one or more decoders. In some implementations, the object recognition model can include one or more classification models. The object recognition output can include an instance-level object recognition associated with the object. The language output can include a scene understanding associated with the input image.

Another example aspect of the present disclosure is directed to one or more non-transitory computer-readable media that collectively store instructions that, when executed by one or more computing devices, cause the one or more computing devices to perform operations. The operations can include obtaining image data. The image data can include an input image. The operations can include processing the input image to determine an object recognition output. The object recognition output can be descriptive of identification details for an object depicted in the input image. The operations can include processing the input image with a vision language model to generate a language output. The language output can include a set of words predicted to be descriptive of the input image. In some implementations, the set of words can include a term descriptive of predicted identification of the object depicted in the input image. The operations can include processing the object recognition output and the language output to generate an augmented language output. The augmented language output can include the set of words with the term replaced with the object recognition output. The operations can include determining one or more search results associated with the augmented language output. The one or more search results can be associated with one or more web resources.

In some implementations, processing the input image to determine the object recognition output can include processing the input image with a search engine to determine text data descriptive of an object identification. Processing the input image to determine the object recognition output can include processing the input image with an embedding model to generate an image embedding and determining one or more object labels based on the image embedding. The one or more object labels can include the identification details for the object depicted in the input image. In some implementations, determining the one or more search results associated with the augmented language output can include determining a plurality of search results are responsive to a search query comprising the augmented language output. The operations further can include providing the plurality of search results for display.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 4A-4C depict illustrations of example fine-grained object recognition with scene understanding according to example embodiments of the present disclosure.

FIGS. 6A-6B depict illustrations of example scene description generation templates according to example embodiments of the present disclosure.

Figure 1:
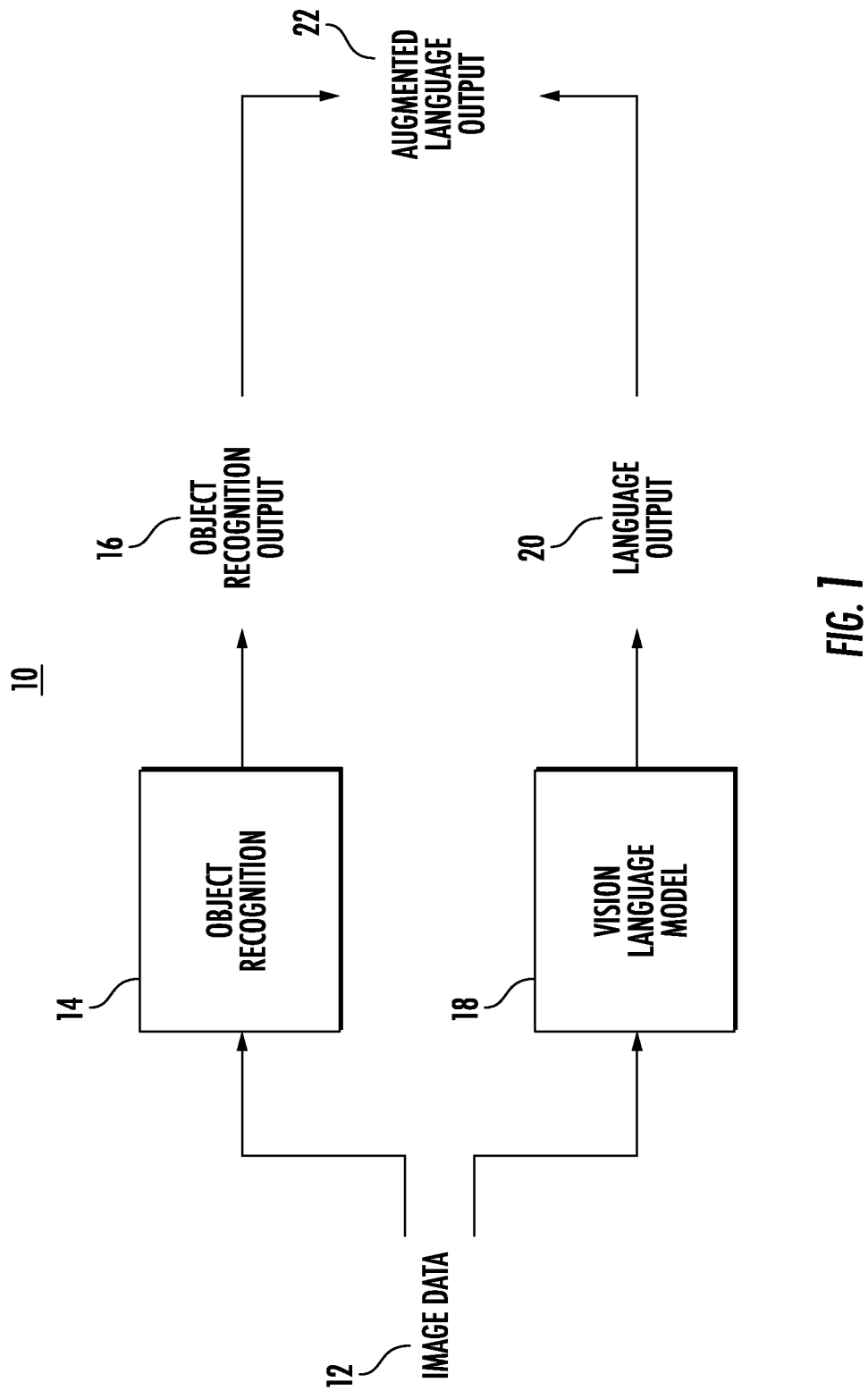
FIG. 1 depicts a block diagram of an example detailed image captioning system according to example embodiments of the present disclosure.

Reference numerals that are repeated across plural figures are intended to identify the same features in various implementations.

DETAILED DESCRIPTION

Generally, the present disclosure is directed to systems and methods for detailed instance-level scene recognition. In particular, the systems and methods disclosed herein can leverage an object recognition system and a vision language model to generate detailed captions, queries, and/or prompts associated with input images. For example, an object recognition system (e.g., a system with one or more object recognition models) can process an input image to generate an object recognition output descriptive of a recognition of a particular object of a particular object class. The object recognition output can be descriptive of a detailed identification of the specific object instance. Additionally, a vision language model can process the input image to generate a language output descriptive of a scene recognition for the scene depicted in the input image. The language output can include details descriptive of the environment and one or more objects in the environment. The language output may not include the granularity and/or specificity of the object recognition output. The object recognition model and the vision language model may process the input image in parallel to reduce latency. The object recognition output and the language output can then be processed to generate an augmented language output that is descriptive of the scene recognition of the language output with the specificity and/or particularity of the object recognition output. For example, the language output may include an identification of a particular object class for the object depicted in the input image, while the augmented language output may include a specific indication of an instance-level identification of the depicted object (e.g., a brand and model name for a product, a name of a depicted person, a name for a piece of art, and/or a species and subspecies identification for a plant or animal).

The augmented language output may then be leveraged as a query and/or a prompt to obtain additional information associated with the scene and/or objects depicted in the input image. In some implementations, input text may be received with the input image, and the language output and/or the augmented language output may be generated based in part on the input text. Therefore, a user may ask a question about a depicted scene, a detailed scene recognition can be generated, and a detailed query and/or prompt can be generated that includes the semantic intent of the question and the recognition information of the augmented language output. The augmented language output may be processed with a search engine and/or a generative model (e.g., a large language model, a vision language model, an image generation model, etc.) to generate the additional information, which may be responsive to the input question.

Vision language models can leverage learned image and language associations to generate natural language captions for images; however, vision language models can struggle with details including object particularity. The lack of particularity can lead to the generation of generalized queries and/or prompts, which may fail to provide results that are specific to and/or applicable to the features depicted in the image. For example, a user may provide an image with a question "how do I take care of this?" The vision language model may process the image to determine the image depicts a plant, which can be leveraged to generate a refined query of "what do plants need to stay alive and grow?" The refined query can be processed to determine search results that may be associated with general care instructions for plants, which may include watering twice a week, half a day of direct sunlight, and loamy soil. However, the generalized care instructions may not be suitable for the specific plant depicted in the image (e.g., a succulent (e.g., an agave plant) needs less water and different soil, and a shuttlecock fern may thrive in shade over direct sunlight). Therefore, the utilization of generalized information for the object class may be detrimental to the caretaking and counter to the original purpose of the inputs.

The systems and methods disclosed herein can process an image with a vision language model and a fine-grained object recognition model in parallel to generate an output that is scene-aware and object-aware while being formatted in a natural language format. The parallel processing can be separate and independent such that the scene-aware output and the object-aware output are determined separately and without influence of the other. Token replacement can be utilized to replace coarse-grained object recognition (e.g., object class recognition (e.g., a plant, a human, a car, a building, etc.)) of the vision language model with the fine-grained recognition (e.g., specific object recognition indicating the particular object identification (e.g., a Tiger lily, George Washington, a Model T soft-top convertible with 5L engine, Monticello, etc.)) of the instance level object recognition system. For example, the systems and methods can include processing the input image with an object recognition system to generate an object recognition output descriptive of identification details for the particular object depicted in the input image. The identification details can include an instance-level identification descriptive a specific and detailed identification for the object. The systems and methods can also process the input image with the vision language model to generate a language output descriptive of scene recognition for the entire scene depicted in the input image. The scene recognition may be less particular than the object recognition output. Therefore, the systems and methods may process the object recognition output and the language output to generate an augmented language output that leverages the scene recognition of the language output and the particularity of the object recognition output.

Pairing instance level object recognition with vision language model processing can be utilized to generate detailed captions, queries, and/or prompts. Combining scene understanding with instance understanding can be leveraged for image searching, image indexing, automated content generation and/or understanding, and/or other image understanding tasks. For example, the augmented language output can be leveraged as and/or to generate a detailed query and/or a detailed prompt to obtain and/or generate additional information. The particularity can lead to improved tailoring of search results and/or generative prompts.

Different objects within the same object class can have different properties for maintenance, use, assembly, and/or repair, which can cause generalized search queries to generate search results that may not be relevant for that particular object. Therefore, leveraging scene understanding with object understanding can generate outputs that can be processed with a search engine and/or a machine-learned model to generate object-aware information.

Multimodal large language models (e.g., large vision language models) may be tuned and/or trained to have a rough understanding of images. For example, processing an image with a large language model may be able to output "This is a black dog sitting on a beach". However, object recognition systems can be trained and/or configured to recognize objects at instance level granularity. In the same image, the object recognition system can recognize the dog's breed as Australian Kelpie and the beach as Bondi beach. When coupling the two systems, the systems and methods can teach and/or condition the large language model that the scene includes an Australian Kelpie sitting on the Bondi beach. The large language model can then learn and/or be prompted to describe a scene at instance level granularity. The systems and methods disclosed herein can be utilized to recognize every product in an aisle as the user walks past the products and can then help the user to find the products that meet their dietary restrictions and/or other preferences and criteria.

In some implementations, object recognition and/or scene recognition techniques (including visual search) may be utilized to tune and/or train visual-language models for instance level recognition, which can include training the visual-language model for attribute specificity based on an output from a visual search.

The systems and methods disclosed herein can be leveraged to process a plurality of different data types (e.g., image data, text data, video data, audio data, statistical data, graph data, latent encoding data, and/or multimodal data) to generate outputs that may be in a plurality of different data formats (e.g., image data, text data, video data, audio data, statistical data, graph data, latent encoding data, and/or multimodal data). For example, the input data may include a video that can be processed to generate a summary of the video, which may include a natural language summary, a timeline, a flowchart, an audio file in the form of a podcast, and/or a comic book. The object recognition system can be leveraged for object specific details, while the scene understanding model (e.g., a vision language model) may be leveraged for scene recognition and/or frame group understanding. In some implementations, one or more additional models may be leveraged for context understanding. For example, a hierarchical video encoder may be utilized for frame understanding, frame sequence understanding, and/or full video understanding. Audio input processing may include the utilization of a text-to-speech model, which may be implemented as part of the language model.

The systems and methods of the present disclosure provide a number of technical effects and benefits. As one example, the system and methods can be utilized to generate instance level scene recognition outputs. In particular, the systems and methods disclosed herein can leverage a vision language model in parallel with an object recognition system to generate a natural language output that is both scene-aware and object specific. The augmented language output can then be utilized as a query for a search and/or a prompt for generative model content generation.

Another example technical effect and benefit relates to improved computational efficiency and improvements in the functioning of a computing system. For example, a technical benefit of the systems and methods of the present disclosure is the ability to reduce the computational resources needed for detailed query and/or detailed prompt generation. In particular, training and/or tuning a language model for instance level object recognition can be computationally expensive and may require a large training dataset. Additionally, training a language model for such particularity may be computationally expensive for model inference. The process disclosed herein can reduce the training time and resource cost for detailed image captioning to generate instance level scene recognition outputs. In some implementations, the input image can be processed with the object recognition model and the vision language model in parallel to reduce latency. Alternatively and/or additionally, the input image can be processed with the object recognition model and the vision language model at different times if performed by a computing device with limited processing power.

With reference now to the Figures, example embodiments of the present disclosure will be discussed in further detail.

FIG. 1 depicts a block diagram of an example detailed image captioning system 10 according to example embodiments of the present disclosure. In some implementations, the detailed image captioning system 10 is configured to receive, and/or obtain, a set of input data including image data 12 descriptive of an environment with one or more objects and, as a result of receipt of the image data 12, generate, determine, and/or provide an augmented language output 22 that is descriptive of an object instance level scene recognition. Thus, in some implementations, the detailed image captioning system 10 can include a vision language model 18 that is operable to perform scene recognition and an object recognition block 14 that is operable to perform object recognition.

In particular, the detailed image captioning system 10 can obtain input data, which can include image data 12 descriptive of one or more input images. The one or more input images can be descriptive of an environment and one or more objects. The environment can include a room, a landscape, a city, a town, a sky, and/or other environments. In some implementations, the environment is descriptive of a user environment generated with one or more image sensors of a user computing device. The one or more objects can include products, people, plants, animals, art pieces, structures, landmarks, and/or other objects.

The image data 12 can be processed with parallel processing pipelines. The first pipeline can process the image data 12 to generate an object recognition output (e.g., an instance level object recognition). The second pipeline can process the image data 12 to generate a language output 20 descriptive of a scene recognition. The detailed image captioning system 10 can then process the outputs of the pipelines to generate an augmented language output 22 descriptive of a detailed image caption.

For example, the object recognition block 14 (e.g., an object recognition system) can process the image data 12 to generate an object recognition output 16 descriptive of a fine-grained object recognition. The object recognition output 16 can include identification details for the one or more objects depicted in the one or more input images. The identification details can be descriptive of an instance level recognition associated with a particular object in a particular object class, which may include a product model name, a plant species and/or subspecies, a particular person's name, a name of a piece of art, a location name, and/or other instance level identifiers.

The object recognition block 14 may include an object recognition model, which may include one or more machine-learned models. The object recognition model may be trained and/or configured to process an image, detect an object, segment a portion of the image that includes the object, and then process the image segment to generate a recognition output. The object recognition model may include a detection model that processes the input images to generate bounding boxes indicating a position of the detected objects. A segmentation model of the object recognition model may then segment the detected objects based on the bounding boxes to generate image segments for the detected objects. The image segments can then be processed with a classification model of the object recognition model to generate object classifications. The object classifications can then be processed to generate the object recognition output 16.

Alternatively and/or additionally, the object recognition block 14 may include one or more embedding models. The one or more embedding models may process the image data 12 and/or the image segments to generate one or more image embeddings. The one or more image embeddings may be utilized to query an embedding space for similar embeddings, neighbor embeddings, embedding clusters, and/or embedding labels (e.g., a label descriptive of a learned property for a learned distribution in the embedding space). The similar embeddings, the neighbor embeddings, the embedding clusters, and/or the embedding labels may be utilized to obtain a plurality of web resources determined to be associated with the object depicted in the one or more input images. The plurality of web resources may be processed to determine details associated with the object, which may include a product name, an object origin, an object listing, an object location, other instances of the object, other identifiers, and/or other details. The details can then be utilized to generate the object recognition output 16. The plurality of web resources may be sources of the content items embedded to generate the similar embeddings, the neighbor embeddings, and/or the other embeddings in the embedding clusters.

The object recognition block 14 may generate an object recognition output 16 for each object depicted in the input images. Alternatively and/or additionally, the object recognition block 14 can determine a focal object and/or an object of interest based on object location, object size, image semantics, image focus, occurrence in a sequence of input images, and/or other contextual attributes.

The vision language model 18 can process the image data 12 to generate a language output 20. The language output 20 can be a natural language text string that is descriptive of a scene recognition for a scene (e.g., the environment and the one or more objects) depicted in the one or more input images. The language output 20 can include coarse-grained recognition outputs associated with the location and/or the one or more objects, which may include class identification for the location and the one or more objects.

The vision language model 18 can include a language model trained, configured, and/or tuned to process multimodal data, which may include tuning for image understanding tasks. For example, the vision language model 18 may be trained on a training dataset including image-caption pairs. The image-caption pairs can include a training image and a respective training caption for the particular training image. Training and/or tuning can include processing a training image with the vision language model 18 to generate a predicted text string. The predicted text string and the respective training caption can be processed to evaluate a loss function to generate a gradient descent. The gradient descent can then be backpropagated to adjust one or more parameters of the vision language model.

Alternatively and/or additionally, the vision language model can include a text encoder and an image encoder that may have been jointly trained and/or jointly tuned to encode input data, which can then be processed with a decoder to generate the vision language model output. In some implementations, an image embedding model may be trained to process images and generate image embeddings that can then be processed with the large language model. The image embeddings can be descriptive of representations associated with image features.

The object recognition output 16 and the language output 20 can then be processed to generate the augmented language output 22. The augmented language output 22 can include the scene understanding of the language output 20 with the object recognition granularity of the object recognition output 16. In some implementations, the augmented language output 22 can be descriptive of a detailed image caption for the one or more input images.

Figure 2:
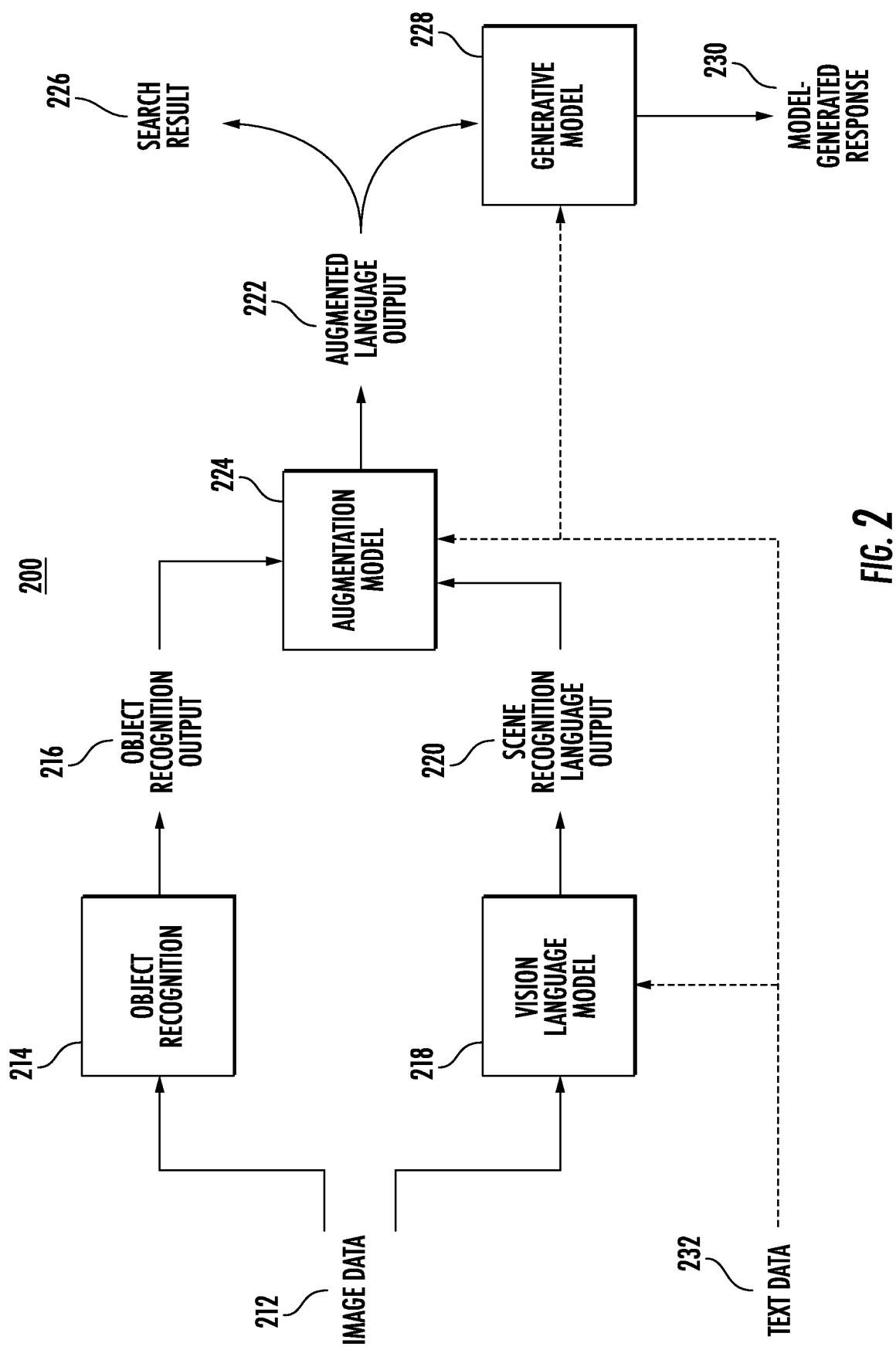
FIG. 2 depicts a block diagram of an example generative model leveraged search system according to example embodiments of the present disclosure.

FIG. 2 depicts a block diagram of an example generative model leveraged search system 200 according to example embodiments of the present disclosure. The generative model leveraged search system 200 is similar to detailed image captioning system 10 of FIG. 1 except that generative model leveraged search system 200 further includes search result 226 determination and a generative model 228 for generating a generative response 230.

In particular, the generative model leveraged search system 200 can obtain input data, which can include image data 212 descriptive of one or more input images (e.g., one or more image of a beef wellington on a large plate with kale on a red tablecloth) and text data 232 descriptive of a request for particular information (e.g., a request for a recipe for the depicted beef wellington). The one or more input images can be descriptive of an environment and one or more objects. The environment can include a room, a landscape, a city, a town, a sky, and/or other environments. In some implementations, the environment is descriptive of a user environment generated with one or more image sensors of a user computing device. The one or more objects can include products, people, plants, animals, art pieces, structures, landmarks, and/or other objects.

The image data 212 and/or the text data 232 can be processed with one or more image processing pipelines. The first pipeline can process the image data 212 to generate an object recognition output (e.g., an instance level object recognition). The second pipeline can process the image data 212 and/or the text data to generate a language output 220 descriptive of a scene recognition. The pipelines may be performed in parallel, in series, and/or in a self-attention loop. The generative model leveraged search system 200 can then process the outputs of the pipelines and/or the text data 232 to generate an augmented language output 222 descriptive of a detailed image caption. The augmented language output 222 can then be processed with a search engine and/or a generative model 228 to obtain and/or generate additional data (e.g., one or more search results 226 and/or one or more model-generated responses 230.

For example, the object recognition block 214 (i.e., an object recognition system) can process the image data 212 to generate an object recognition output 216 descriptive of a fine-grained object recognition. The object recognition output 216 can include identification details (e.g., "beef wellington", Jane Doe, Mona Lisa, Sixteenth Chapel, Washington Monument, Brand X Model YZ Smartphone, etc.) for the one or more objects depicted in the one or more input images. The identification details can be descriptive of an instance level recognition (e.g., recognition for that specific object depicted) associated with a particular object in a particular object class, which may include a product model name, a plant species and/or subspecies, a particular person's name, a name of a piece of art, a location name, and/or other instance level identifiers.

The object recognition block 214 may include an object recognition model, which may include one or more machine-learned models (e.g., one or more embedding models, one or more detection models, one or more segmentation models, one or more classification models, one or more semantic understanding models, one or more feature extractors, and/or one or more other models). The object recognition model may be trained and/or configured to process an image, detect an object, segment a portion of the image that includes the object (e.g., segment the image portion within the object and/or segment the object from the image), and then process the image segment to generate a recognition output. The object recognition model may include a detection model that processes the input images to generate bounding boxes indicating a position of the detected objects. A segmentation model of the object recognition model may then segment the detected objects based on the bounding boxes to generate image segments for the detected objects. The image segments can then be processed with a classification model of the object recognition model to generate object classifications. The object classifications can then be processed to generate the object recognition output 216.

Alternatively and/or additionally, the object recognition block 214 may include one or more embedding models. The one or more embedding models may process the image data 212 and/or the image segments to generate one or more image embeddings. The one or more image embeddings may be utilized to query an embedding space for similar embeddings, neighbor embeddings, embedding clusters, and/or embedding labels (e.g., a label descriptive of a learned property for a learned distribution in the embedding space). The similar embeddings, the neighbor embeddings, the embedding clusters, and/or the embedding labels may be utilized to obtain a plurality of web resources determined to be associated with the object depicted in the one or more input images. The plurality of web resources may be processed to determine details associated with the object, which may include a product name, an object origin, an object listing, an object location, other instances of the object, other identifiers, and/or other details. The details can then be utilized to generate the object recognition output 16. The plurality of web resources may be sources of the content items embedded to generate the similar embeddings, the neighbor embeddings, and/or the other embeddings in the embedding clusters.

The object recognition block 214 may generate an object recognition output 16 for each object depicted in the input images. Alternatively and/or additionally, the object recognition block 14 can determine a focal object and/or an object of interest based on object location, object size, image semantics, image focus, occurrence in a sequence of input images, and/or other contextual attributes. In some implementations, the particular object selected for processing may be based on the text data 232 (e.g., "what are recipes for this item?" causes food items to be processed, while "what is that on the right?" causes objects on the right of the input images to be processed).

The vision language model 218 can process the image data 212 and/or the text data 232 to generate a language output 220. The language output 220 can be a natural language text string that is descriptive of a scene recognition for a scene (e.g., the environment and the one or more objects) depicted in the one or more input images. The language output 220 can include coarse-grained recognition outputs associated with the location and/or the one or more objects, which may include class identification for the location and the one or more objects. In some implementations, the language output 220 can be a scene recognition output that includes structure, format, and/or additional language based on processing the text data 232. For example, the text data 232 may include "What is the origin of this food item?", and the language output may include "The image depicts a formal dinner, in which the food item is a pastry, which is presented on a plate with a vegetable on a red table." The object recognition output for the example image may include "beef wellington," "kale," and/or a "maroon tablecloth."

The vision language model 218 can include a language model trained, configured, and/or tuned to process multimodal data, which may include tuning for image understanding tasks. For example, the vision language model 218 may be trained on a training dataset including image-caption pairs. The image-caption pairs can include a training image and a respective training caption for the particular training image. Training and/or tuning can include processing a training image with the vision language model 218 to generate a predicted text string. The predicted text string and the respective training caption can be processed to evaluate a loss function to generate a gradient descent. The gradient descent can then be backpropagated to adjust one or more parameters of the vision language model.

Alternatively and/or additionally, the vision language model can include a text encoder and an image encoder that may have been jointly trained and/or jointly tuned to encode input data, which can then be processed with a decoder to generate the vision language model output. In some implementations, an image embedding model may be trained to process images and generate image embeddings that can then be processed with the large language model. The image embeddings can be descriptive of representations associated with image features.

The object recognition output 216, the language output 220, and/or the text data 232 can then be processed with an augmentation model 224 to generate the augmented language output 222. The augmentation model 224 may include the vision language model, other language models, and/or other generative models. The augmentation model 224 may be trained and/or tuned to identify textual tokens associated with the same object and augment the language output to replace the coarse-grained term of the language output 220 with the fine-grained term of the object recognition output 216. The augmented language output 222 can include the scene understanding of the language output 220 with the object recognition granularity of the object recognition output 216. In some implementations, the augmented language output 222 can be descriptive of a detailed image caption for the one or more input images. For example, the augmented language output 222 can include "The image depicts a formal dinner, in which the food item is a beef wellington, which is presented on a plate with kale on a maroon tablecloth."

In some implementations, the augmented language output 222 and/or the text data 232 can be processed with a search engine to determine one or more search results 226. The augmented language output 222 and/or the text data 232 may include and/or be formatted as a query (e.g., "recipe for a beef wellington"). The one or more search results 224 can be responsive to the query (e.g., web pages, videos, and/or books with beef wellington recipes) posed by the augmented language output 222 and/or the text data 232.

Alternatively and/or additionally, the augmented language output 222 and/or the text data 232 can be processed with a generative model 228 (e.g., a large language model, a text-to-image model, and/or other generative models) to generate one or more model-generated responses 230. The augmented language output 222 and/or the text data 232 may include and/or be formatted as a prompt (e.g., "generate step by step instructions for a beef wellington"). The one or more model-generated responses 230 can be responsive to the prompt of the augmented language output 222 and/or the text data 232 (e.g., the model-generated response can include step by step instructions for preparing a beef wellington based on processing one or more beef wellington recipes and may include images with the steps outlined in the text (e.g., images pulled from web resources and/or images generated with a text-to-image generation model)).

Figure 3:
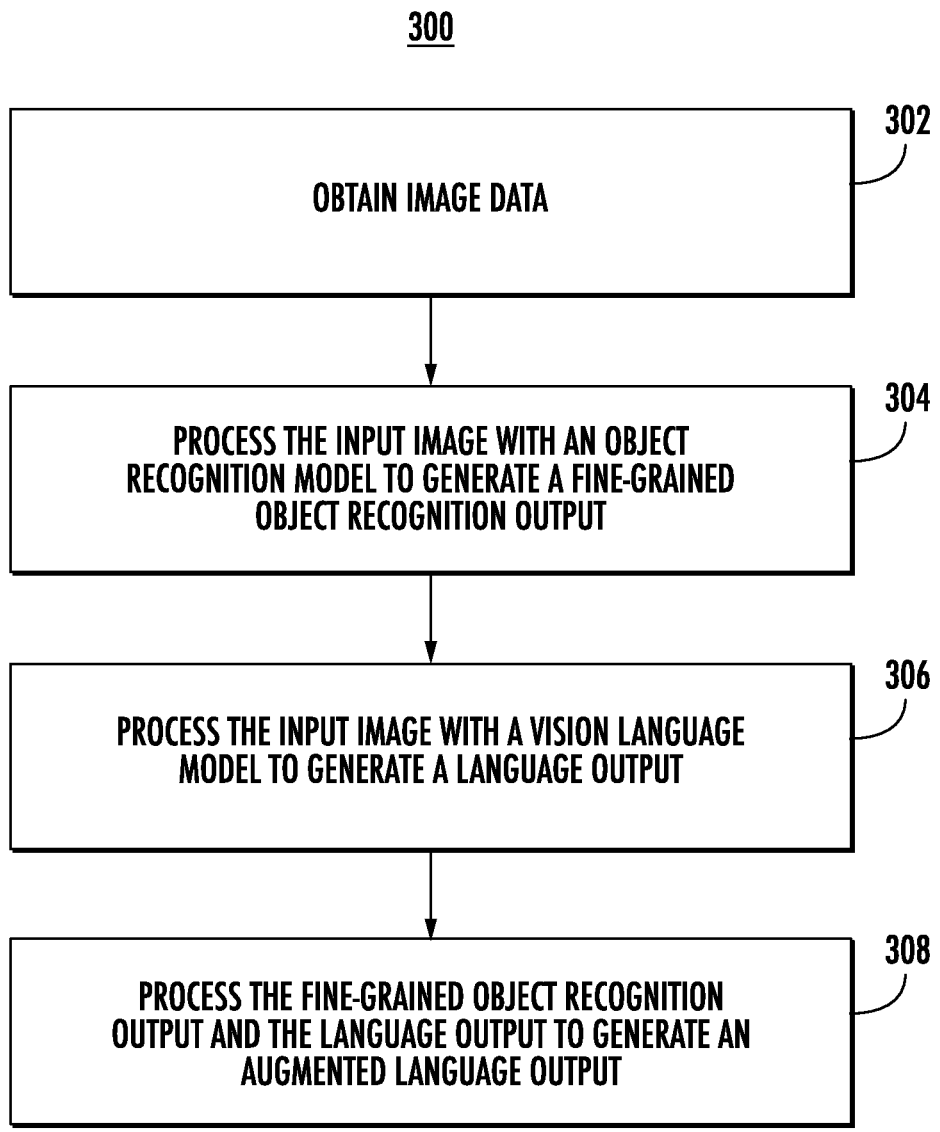
FIG. 3 depicts a flow chart diagram of an example method to perform augmented language output generation according to example embodiments of the present disclosure.

FIG. 3 depicts a flow chart diagram of an example method to perform according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can obtain image data. The image data can include an input image. The input image can include one or more objects in an environment. The environment can include a room, a landscape, and/or other environments. The one or more objects can include people, structures, animals, plants, monuments, art, products, and/or other objects. The computing system may obtain and/or generate the image data with a computing device, which may include a mobile computing device, a smart wearable, a smart appliance, and/or other computing devices.

At 304, the computing system can process the input image with an object recognition model to generate a fine-grained object recognition output. The fine-grained object recognition output can be descriptive of identification details for an object depicted in the input image. The object may include a product, and the fine-grained object recognition output may include a specific product label, which may include a model name, a register number, a model number, a product-specific name, and/or identification details. In some implementations, the object may include a person, and the fine-grained object recognition output may include the person's name. Alternatively and/or additionally, the object may include a piece of art (e.g., a sculpture, a painting, a photograph, etc.), and the fine-grained object recognition output may include the name for the art piece. The object recognition model can include one or more embedding models, one or more detection models, one or more feature extractors, one or more classification models, one or more segmentation models, one or more search engines, and/or one or more other models.

In some implementations, processing the input image with the object recognition model to generate the fine-grained object recognition output can include detecting the object in the input image, generating an object embedding, determining an image cluster associated with the object embedding, and processing web resources associated with the image cluster to determine identification details for the object. Generating the object embedding can include generating a bounding box associated with a position of the object within the input image, generating an image segment based on the bounding box, and processing the image segment with an embedding model to generate the object embedding. Additionally and/or alternatively, the object embedding can be utilized to search an embedding space for neighbor embeddings and/or similar embeddings. In some implementations, one or more embedding clusters can be determined to be associated with the object embedding. The neighbor embeddings, similar embeddings, and/or embedding clusters may be associated with image embeddings, text embeddings, document embeddings, multimodal embeddings, and/or other embeddings. Content items and/or web resources associated with the neighbor embedding(s), similar embedding(s), and/or embedding cluster(s) can be obtained and/or processed to determine the identification details. The identification details can include a precise name (and/or classification) for the particular object. In some implementations, the input image may depict a plurality of objects and a plurality of object recognition outputs can be generated based on the plurality of objects.

At 306, the computing system can process the input image with a vision language model to generate a language output. The language output can include a set of predicted words predicted to be descriptive of the input image. The set of predicted words can include a coarse-grained term descriptive of predicted identification of the object depicted in the input image. In some implementations, the coarse-grained term can include an object type. The fine-grained object recognition output can include a detailed identification of the object. The set of predicted words may include one or more sentences that include the coarse-grained term. The coarse-grained term can include a generalized description of the fine-grained object recognition output (e.g., the coarse-grained term can include "vacuum," while the fine-grained recognition output may include "an RF-600 cordless Dilred XL Vacuum"). The vision language model can include one or more transformer models, one or more autoregressive language models, one or more image encoder models, one or more text encoder models, one or more decoder models, one or more diffusion models, and/or one or more other models. The vision language model may have been trained on image-caption pairs, may have been trained with contrastive learning, may include a prefix language model, may include masked-language modeling, may include image-text matching, may include learned sequence representations, may have been trained with black box optimization, and/or may include multi-modal fusing with cross attention. In some implementations, the vision language model may be trained on a plurality of templates, a plurality of scene types, a plurality of object classes, and/or a plurality of natural language examples.

At 308, the computing system can process the fine-grained object recognition output and the language output to generate an augmented language output. The augmented language output can include the set of predicted words with the coarse-grained term replaced with the fine-grained object recognition output. The augmented language output may be generated by processing the fine-grained object recognition output and the language output with the vision language model, an augmentation model, a natural language processing model, and/or one or more other models. The replacement may be determined by determining the coarse-grained term is associated with the object described by the fine-grained object recognition output. Alternatively, and/or additionally the augmented language output may include a different structure, syntax, wording, and/or direction than the language output based on the processing of the fine-grained object recognition output.

In some implementations, processing the fine-grained object recognition output and the language output to generate the augmented language output can include processing the language output to determine a plurality of text tokens associated with features in the input image, determining a particular token of the plurality of text tokens is associated with the object, and replacing the particular token with the fine-grained object recognition output. In some implementations, determining the particular token of the plurality of text tokens is associated with the object can include processing the fine-grained object recognition output with an embedding model to generate an instance-level embedding, processing the plurality of text tokens with the embedding model to generate a plurality of token embeddings, and determining the instance-level embedding is associated with a particular embedding associated with the particular token.

In some implementations, the computing system can process the augmented language output with a second language model to generate a natural language response to the augmented language output. The natural language response can include additional information associated with the augmented language output. In some implementations, the augmented language output can be processed with the vision language model to generate a response. The response may include text data, image data, audio data, latent encoding data, and/or multimodal data. The language output, the object recognition output, the augmented language output, and/or the response may be conditioned and/or based on input text that may be obtained with the input image.

Additionally and/or alternatively, the computing system can provide the augmented language output in an augmented-reality experience. The augmented-reality experience can include the augmented language output overlayed over a live video feed of an environment. The augmented-reality experience can be provided via a viewfinder of a mobile computing device, via a smart wearable, and/or via other computing devices. The augmented-reality experience can be leveraged to ask and receive additional information on a user's environment via an augmented-reality interface.

Figure 4A:
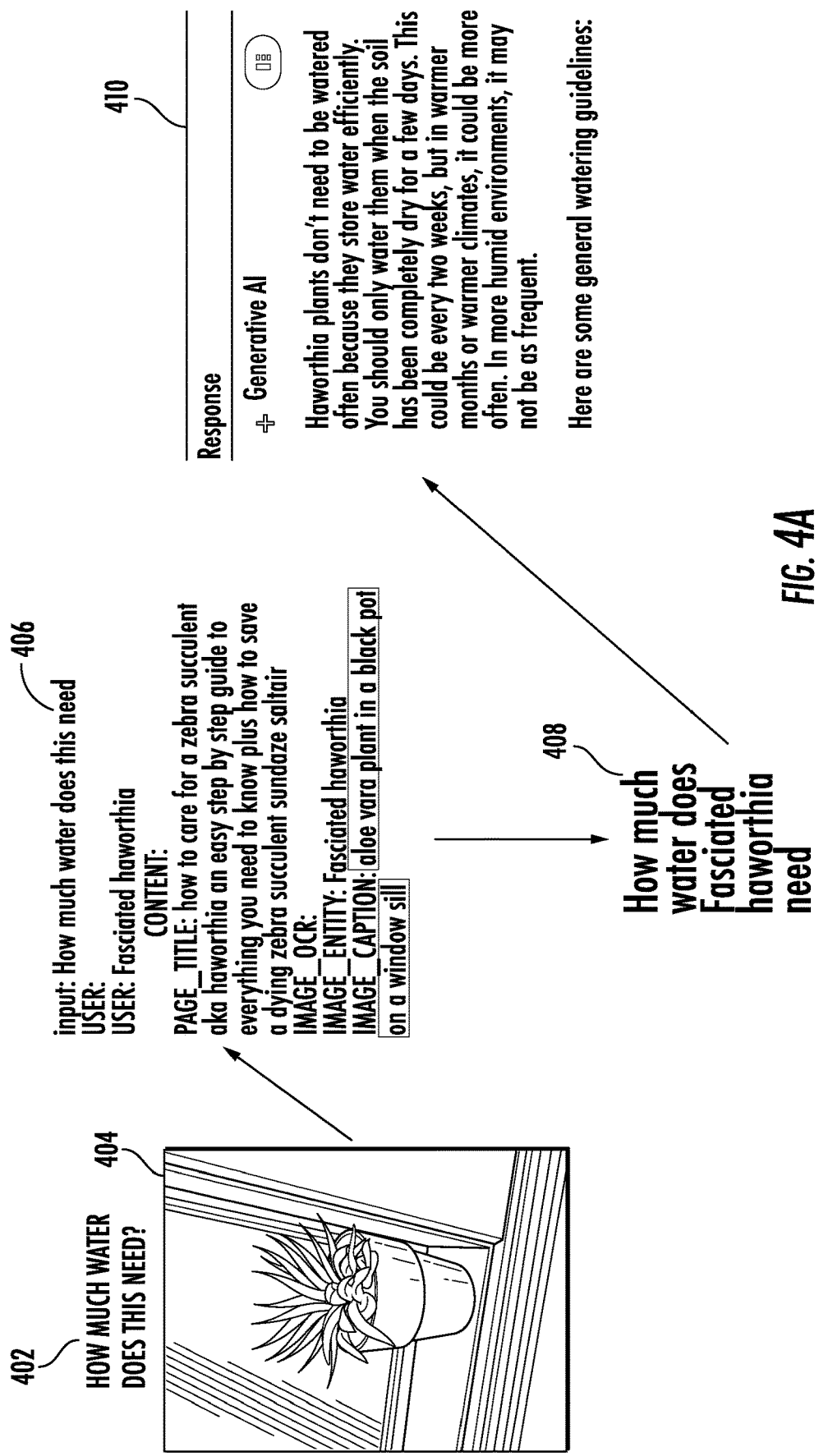
Figure 4B:
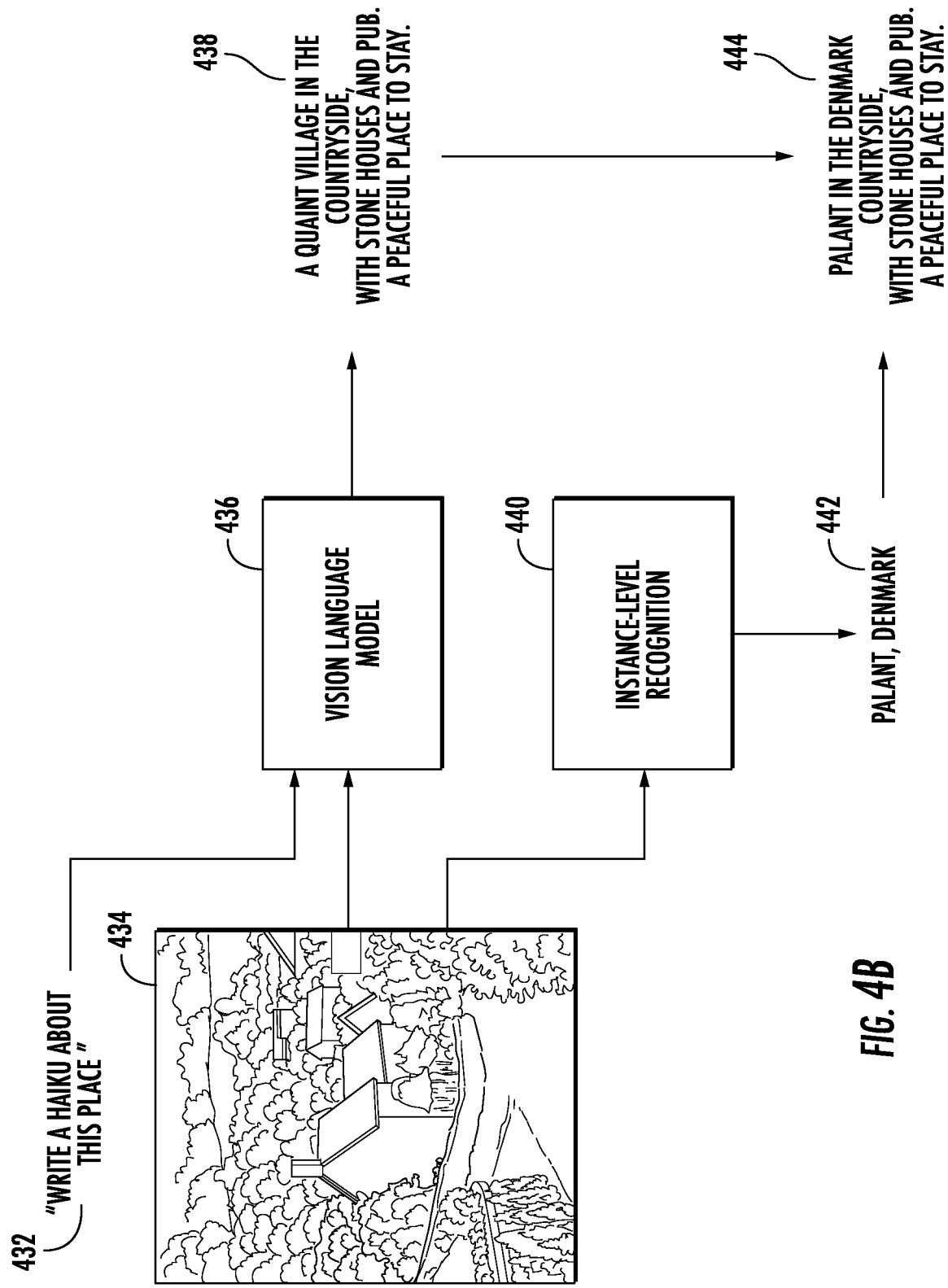

FIGS. 4A-4C depict illustrations of example fine-grained object recognition with scene understanding according to example embodiments of the present disclosure. In particular, FIG. 4A depicts processing input text 402 and an input image 404 to generate an object-aware prompt for generating a model-generated response 410.

The input text 402 can include "How much water does this need?" The input image 404 can include a plant in a pot on the ledge of a window. The input text 402 and input image 404 may be obtained via a mobile computing device, a smart wearable, and/or other computing devices. The inputs may be obtained via one or more user interfaces, which may include a viewfinder interface, a search interface, an augmented-reality interface, and/or an assistant interface.

The input image 404 can be processed with an object recognition system and a vision language model to generate recognition data 406 descriptive of object recognition and scene recognition. For example, the recognition data 406 can include instance-level object recognition (e.g., Fasciated haworthia) generated with the object recognition system. Additionally, the recognition data 406 can include a predicted image caption (e.g., "aloe vera plant in a black pot on a window sill", which may be associated with a scene recognition) generated with the vision language model. In some implementations, the recognition data 406 can include web resources identified as being associated with an object in the input image 404. For example, a webpage with the title "How to care for a zebra succulent aka haworthia an easy step by step guide to everything you need to know to save a dying zebra succulent sundaze saltair" can be determined to be associated with the object in the input image 404 based on a visual search, which may include a reverse image search and/or an embedding based search. The web resource may be processed to determine the web page is associated with the plant "Fasciated haworthia." The entity recognition can then be utilized to determine and/or confirm the fine-grained object recognition.

The recognition data 406 and the input text 402 can be processed to generate a refined prompt 408. The refined prompt can leverage the recognition data 406 and the input text 402 to generate a prompt that includes the intent of the input text 402 with detailed information determined based on the input image 404. The refined prompt 408 may include "How much water does Fasciated haworthia need?"

The refined prompt 408 can be processed with one or more generative models to generate a model-generated response 410. The model-generated response 410 can be responsive to the input text 402 and input image 404. The model-generated response 410 may be generated by obtaining and processing web data associated with search results for the refined prompt. The generative model can then leverage the information of the web data to generate a summary of a response to the refined prompt 408. The refined prompt 408 can include "Haworthia plants don't need to be watered often because they store water efficiently. You should only water them when the soil has been completely dry for a few days. This could be every two weeks, but in warmer months or warmer climates, it could be more often. In more humid environments, it may not be as frequent."

FIG. 4B depicts processing input text 432 and an input image 434 to generate an image-aware model-generated content item 444. The input text 432 can be descriptive of a prompt for generative model generation. For example, the input text 432 can include "Write a haiku about this place." The input image 434 can depict a location with houses and a landscape with grass, bushes, and trees.

A vision language model 436 can process the input text 432 and the input image 434 to generate a preliminary content item 438. The vision language model 436 can process the input image 434 to generate a scene recognition, which can be processed with the input text 432 to generate the preliminary content item 438. The preliminary content item 438 can be responsive to the prompt of the text input 432 while including details from the scene recognition. The preliminary content item 438 may include "A quaint village in the countryside, with stone houses and pub. A peaceful place to stay."

An instance-level recognition block 440 may process the input image 434 to generate an instance level recognition 442 of the depicted location. The instance level recognition block 440 can include a visual search system for granular recognition of objects and/or locations. The instance level recognition 442 can include "Palant, Denmark."

The preliminary content item 438 and the instance level recognition 442 can then be processed to generate the image-aware model-generated content item 444. The image-aware model-generated content item 444 may be generated by processing the preliminary content item 438 and the instance level recognition 442 with a generative model (e.g., the vision language model 436). In some implementations, the image-aware model-generated content item 444 can be generated based on textual token identification and replacement. The image-aware model-generated content item 444 may include "Palant in the Denmark countryside, with stone houses and pub. A peaceful place to stay."

FIG. 4C depicts processing an input image 452 and input text to generate a refined query 458. The input image 453 can depict a particular humidifier. The input text may include a question about the depicted product. For example, the input text can include "what's it use?"

The input image 452 can be processed with an object recognition system and a vision language model to generate recognition data 454. For example, the recognition data 454 can include instance-level object recognition (e.g., QLX Drip XA-Q2 and QLX Drip Humidifier) generated with the object recognition system. Additionally, the recognition data 454 can include a predicted image caption (e.g., "white humidifier on a white background", which may be associated with a scene recognition) generated with the vision language model. In some implementations, the recognition data 454 can include web resources identified as being associated with an object in the input image 452. For example, a webpage with the title "Qax Cool-Mist Humidifier, 1 Gal.—Clear & White" can be determined to be associated with the object in the input image 452 based on a visual search, which may include a reverse image search and/or an embedding based search. The web resource may be processed to determine the web page is associated with the product "QLX Drip Humidifier." The entity recognition can then be utilized to determine and/or confirm the fine-grained object recognition. In some implementations, the recognition data 454 can include an optical character recognition generated by performing optical character recognition on the input image 452 to determine the input image 452 includes the text "QLX."

The recognition data 454 and the input text can be processed to generate an augmented language output 456. The augmented language output 456 can include a refined image caption, which may include "This image is about a white humidifier on a white background. It is about QLX Drip XA-Q2 or QLX Drip Humidifier. Image comes from a page with title 'Qax Cool-Mist Humidifier, 1 Gal.—Clear & White'. Text on the image says: QLX." The refined image caption may be generated with a vision language model and may leverage the object recognition output of the object recognition system with the scene recognition of the vision language model.

The augmented language output 456 and the input text can then be processed to generate a refined query 458. The refined query 458 can include "What is the use of QLX Drip Humidifier?" The refined query 458 may be generated by leveraging the information from the augmented language output 456 to provide a detailed identifier for what the user has a question about.

Figure 5:
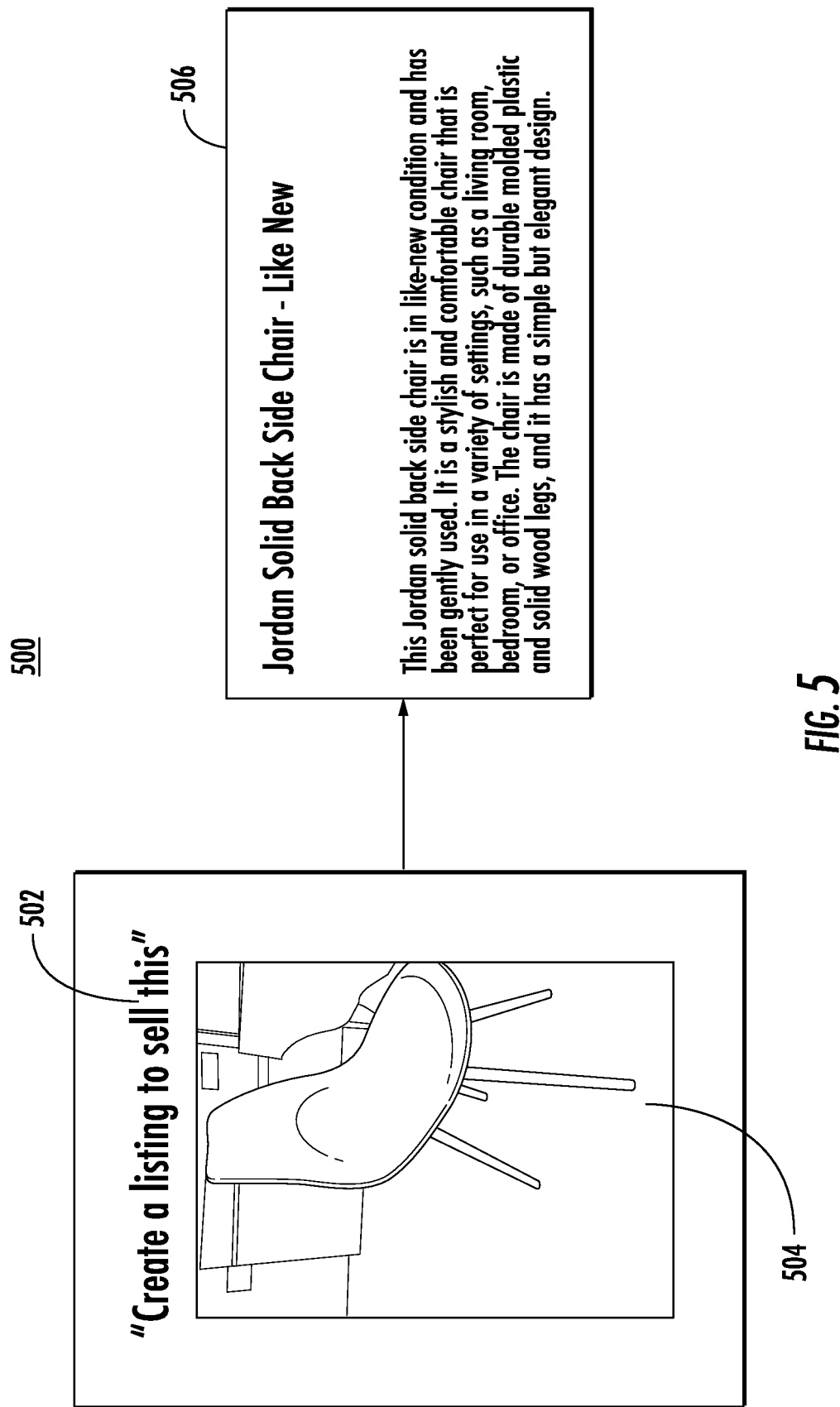
FIG. 5 depicts an illustration of an example generative model response system according to example embodiments of the present disclosure.

FIG. 5 depicts an illustration of an example generative model response system 500 according to example embodiments of the present disclosure. In particular, the generative model response system 500 can obtain an input image 504 and input text 502 to generate a model-generated response 506. For example, the input text 502 can include "create a listing to sell this," the input image 504 can depict a white chair in a room, and the model-generated response 506 can include a model-generated listing.

The generative model response system 500 can leverage an object recognition system to determine the particular product depicted in the input image 504. A generative model may then process the object recognition and the input text 502 to generate the model-generated response 506. In some implementations, the generative model may utilize one or more application programming interfaces to obtain additional information associated with the recognized product that can be leveraged for generating a detailed product listing.

Figure 6B:
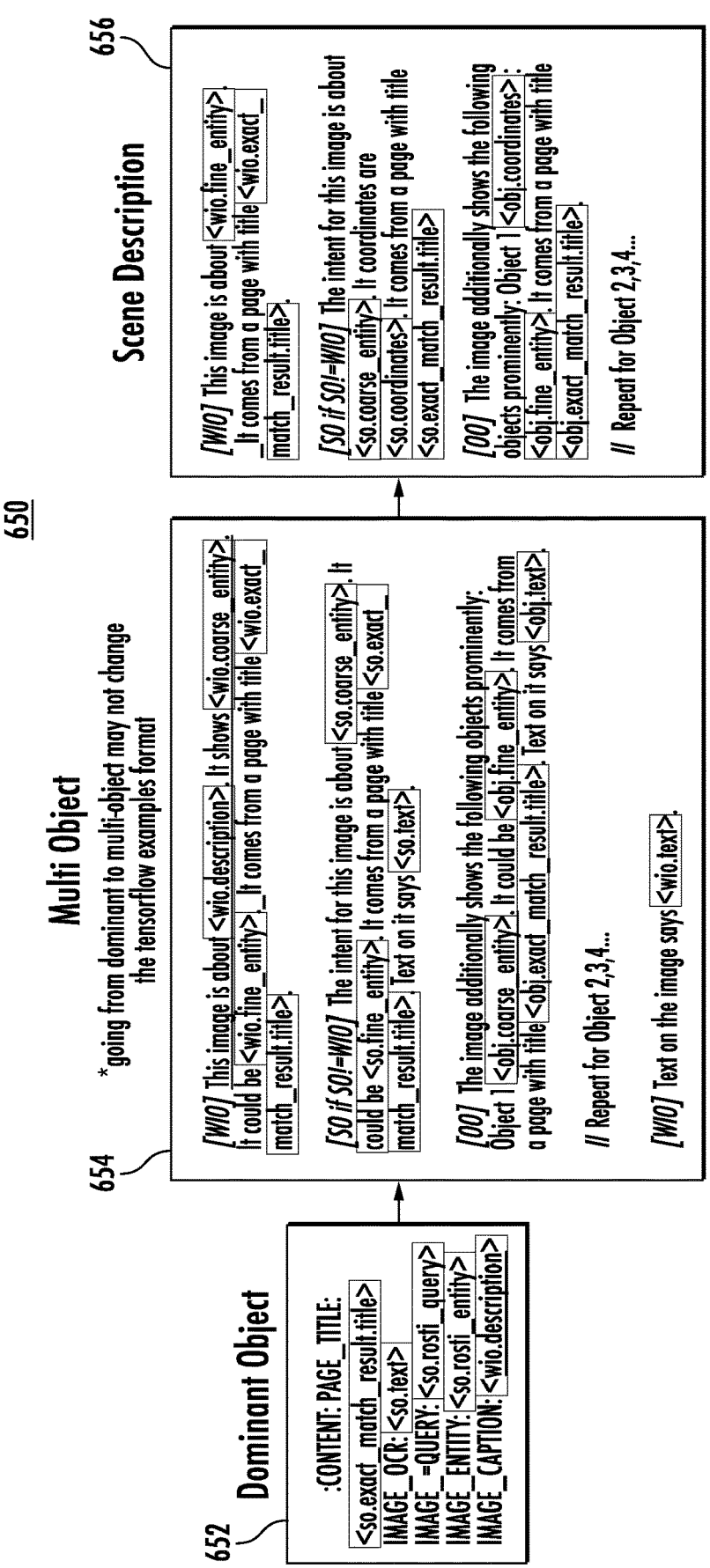

FIGS. 6A-6B depict illustrations of example scene description generation templates according to example embodiments of the present disclosure. In particular, FIG. 6A can depict templates 600 for query generation. The templates 600 can be leveraged to prompt a generative model for question and answer tasks, image captioning, and/or query generation. The templates 600 may be utilized for prompting the generative model for a masked language task.

The templates 600 can include a question and answer prompt template 602, an image captioning template 604, and a query template 606. The question and answer prompt template 602 can be utilized to instruct a generative model to generate and answer a question based on the input data. The image captioning template 604 can be utilized to instruct the generative model to generate an image caption that fills the mask tokens with details determined based on the input image, which may include details associated with the whole image, a selected object in the image, and/or other objects in the image. The query template 606 can be utilized to instruct the generative model to generate a query based on the multimodal input data.

In some implementations, the question and answer prompt template 602, the image captioning template 604, and/or the query template 606 may be processed to generate a detailed prompt. For example, the question and answer prompt template 602 can be utilized as a preamble for the prompt construction, the image captioning template 604 can be leveraged as the scene description, and the query template 606 can be leveraged for distilling the intent.

FIG. 6B depicts different recognition output templates 650. The recognition output templates 650 can include a dominant object template 652, a multi-object template 654, and/or a scene description template 656. The dominant object template 652 may include an itemized table to be completed based on the outputs of the object recognition system and the vision language model. The multi-object template 654 can include a natural language template that includes masked tokens to be replaced by text tokens associated with recognition data generated with the object recognition system and the vision language model. The scene description template 656 can include a natural language template in the form of a scene description that may be provided by an individual. The scene description template 656 can include masked tokens to be replaced by text tokens associated with recognition data generated with the object recognition system and the vision language model.

Figure 7:
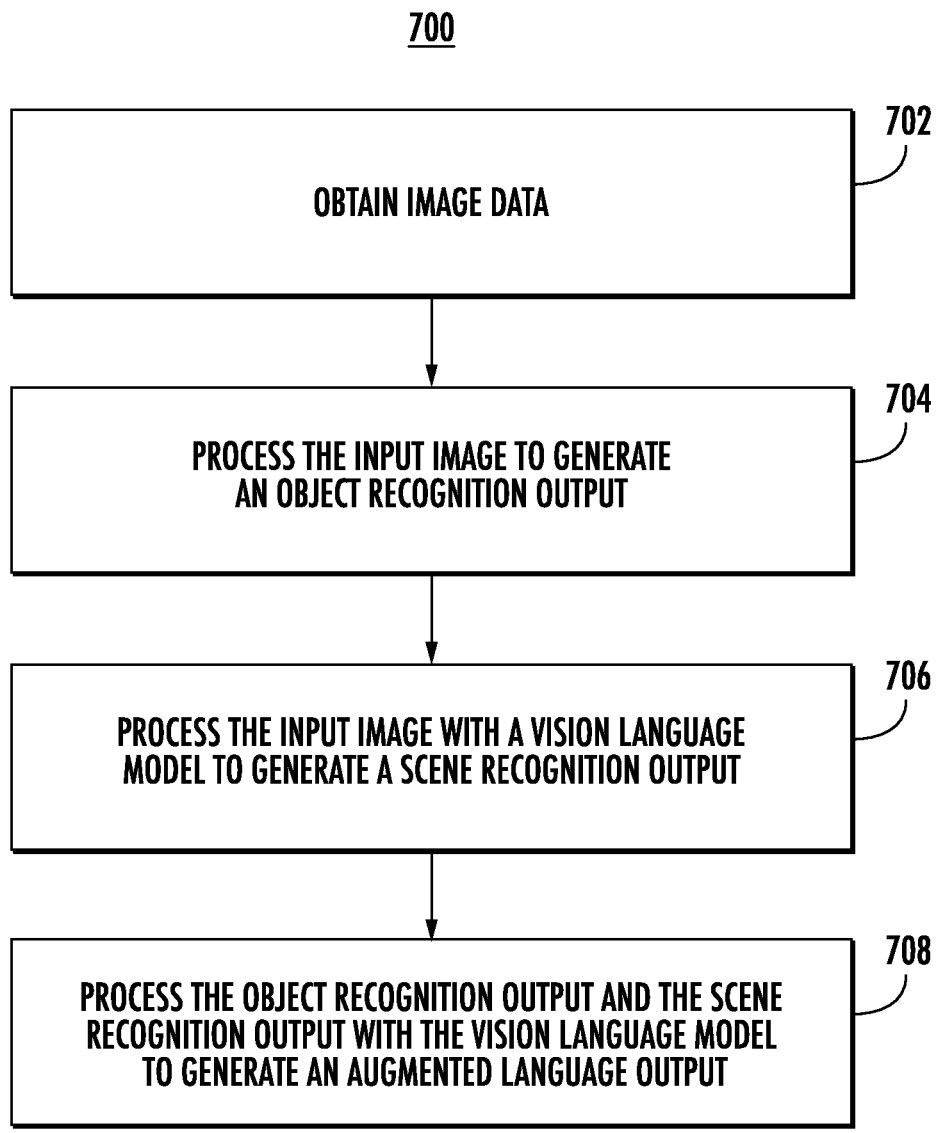
FIG. 7 depicts a flow chart diagram of an example method to perform object-aware scene recognition according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain image data. The image data can include an input image. The input image can be descriptive of the object in an environment with one or more additional objects. In some implementations, the computing system can include text data with the image data. The text data can be descriptive of a prompt for a generative model (e.g., generate a short story based on the object in this lake" and/or "what is origin of this structure?"). The text data may include input text that references the object and/or the environment.

At 704, the computing system can process the input image to generate an object recognition output. In some implementations, the computing system can process the input image with an object recognition model to generate the object recognition output. Alternatively and/or additionally, the computing system may process the input image with a visual search engine to determine one or more visual search results that may then be processed to determine the object recognition output. The object recognition output can be descriptive of identification details for an object depicted in the input image. The object recognition output can be associated with the object. In some implementations, the object recognition model can include one or more classification models. The object recognition output can include an instance-level object recognition associated with the object. The computing system may segment a portion of the input image associated with the object to then be processed to generate the object recognition output. In some implementations, the image segmentation may be based on the text data. The object recognition output may be generated based on visual search optical character recognition feature recognition, object classification, and/or one or more other techniques.

At 706, the computing system can process the input image with a vision language model to generate a scene recognition output. The scene recognition output can include a language output. The language output can include a set of predicted words predicted to be descriptive of the input image. The set of words can include a term descriptive of predicted identification of the object depicted in the input image. The language output can be associated with the object and the environment with the one or more additional objects. In some implementations, the vision language model may have been trained on a training dataset including a plurality of image-caption pairs. The plurality of image-caption pairs can include a plurality of training images and a plurality of respective captions associated with the plurality of training images. In some implementations, the vision language model can include one or more text encoders, one or more image encoders, and one or more decoders. The language output can include a scene understanding associated with the input image. In some implementations, the computing system can process the image data and the text data with the vision language model to generate the language output. The language output may be based on the prompt of the text data. The language output may be formatted as a generative model prompt, a query, a dialogue message, a question, and/or a response. The input image can be processed with the object recognition model and the vision language model in parallel to perform parallel determination of the object recognition output and the language output. In some implementations, the object recognition output can be determined independent of the determination of the language output, and the language output can be determined independent of the determination of the object recognition output. Both the object recognition model and the vision language model can process the input image separately to perform their respective determinations.

At 708, the computing system can process the object recognition output and the scene recognition output with the vision language model to generate an augmented language output. The augmented language output can include the set of words with the term replaced with the object recognition output. Alternatively and/or additionally, the augmented language output can include a query and/or a prompt (e.g., a prompt of the language output) augmentation based on the object recognition output. In some implementations, the object recognition output, the scene recognition output, and/or the text data can be processed with a generative model to generate a model-generated response. The model-generated response can include text data, image data, audio data, latent encoding data, and/or multimodal data.

Figure 8:
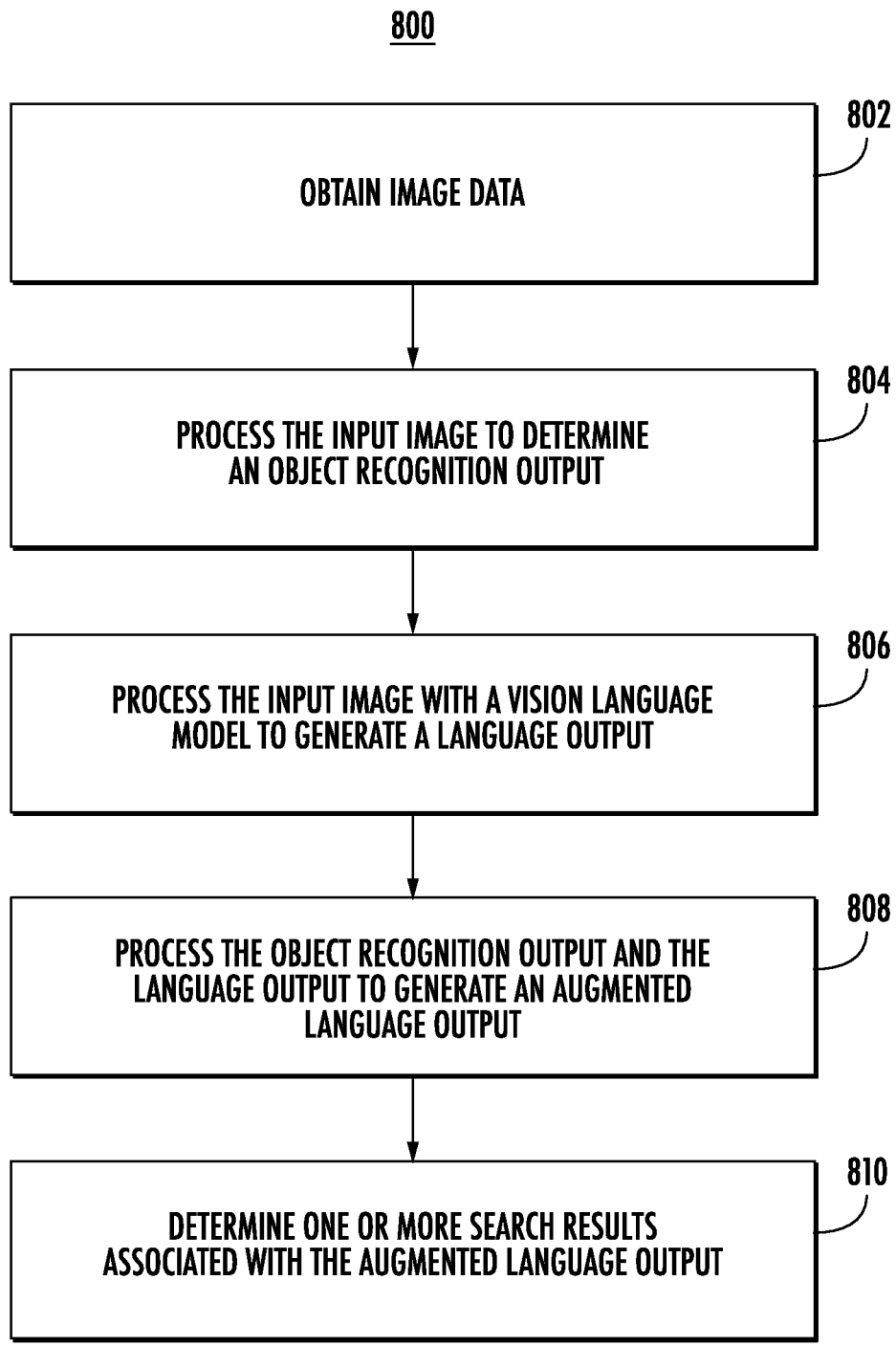
FIG. 8 depicts a flow chart diagram of an example method to perform generative model leveraged search according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain image data. The image data can include an input image. The input image can be descriptive of a particular environment and/or one or more particular objects. The input image may be obtained and/or generated with a visual search application. In some implementations, the image data can be obtained and/or generated with a smart wearable (e.g., a smart watch, smart glasses, a smart helmet, etc.). The image data may be obtained with other input data, which may include text data and/or audio data associated with a question.

At 804, the computing system can process the input image to determine an object recognition output. The object recognition output can be descriptive of identification details for an object depicted in the input image. Processing the input image to determine the object recognition output can include processing the input image with a search engine to determine text data descriptive of an object identification. The search engine may perform feature search, embedding based search, optical character recognition search, and/or other search techniques. In some implementations, the search engine may identify a plurality of search results responsive to the image query. The plurality of search results may be parsed and/or processed to determine one or more object labels. The object labels can be based on processing the plurality of search results with a semantic understanding model, a language model, and/or other models. In some implementations, the input image and/or the plurality of search results may be embedded to determine a text embedding associated with the generated embedding. The text embedding may be decoded to determine the object label.

Alternatively and/or additionally, processing the input image to determine the object recognition output can include processing the input image with an embedding model to generate an image embedding and determining one or more object labels based on the image embedding. The one or more object labels can include the identification details for the object depicted in the input image. The object labels may be indexed labels associated with one or more data clusters.

At 806, the computing system can process the input image with a vision language model to generate a language output. The language output can include a set of predicted words predicted to be descriptive of the input image. The set of words can include a term descriptive of predicted identification of the object depicted in the input image. The vision language model may include a language model tuned to process image data and/or multimodal data. The vision language model may have been trained to encode an image and output text. The vision language model may include a plurality of separate models utilized in series and/or in parallel.

At 808, the computing system can process the object recognition output and the language output to generate an augmented language output. The augmented language output can include the set of words with the term replaced with the object recognition output. The object recognition output and/or the language output may be processed with a generative model (e.g., a generative language model, a text-to-image generation model, etc.) to generate a model-generated output. The model-generated output can include additional information associated with the one or more particular environments and/or the one or more particular objects.

At 810, the computing system can determine one or more search results associated with the augmented language output. The one or more search results can be associated with one or more web resources. In some implementations, determining the one or more search results associated with the augmented language output can include determining a plurality of search results are responsive to a search query including the augmented language output. Additionally and/or alternatively, the computing system can provide the plurality of search results for display.

Figure 9A:
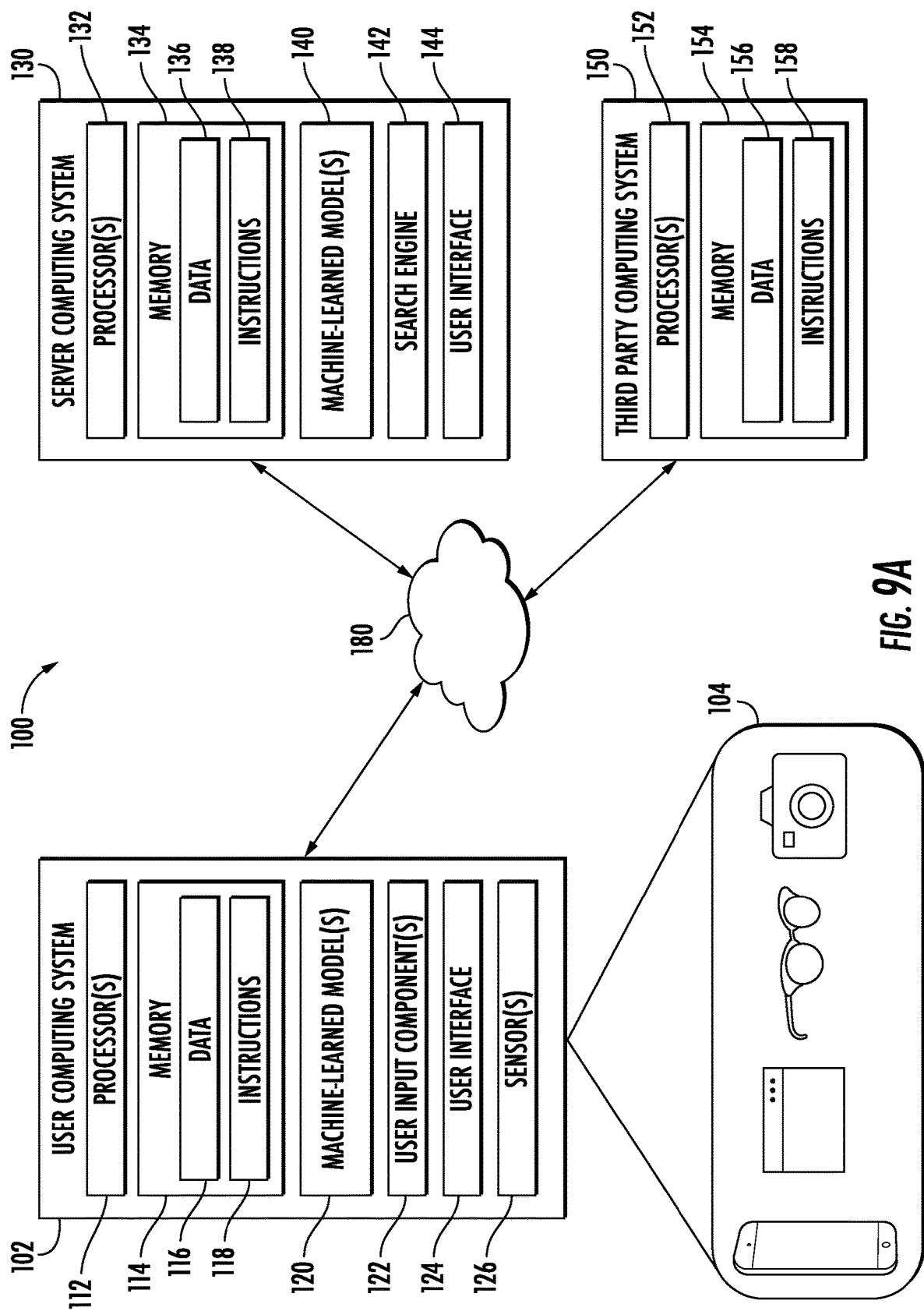
FIG. 9A depicts a block diagram of an example computing system that performs instance level scene recognition according to example embodiments of the present disclosure.

FIG. 9A depicts a block diagram of an example computing system 100 that performs instance level scene recognition according to example embodiments of the present disclosure. The system 100 includes a user computing system 102, a server computing system 130, and/or a third computing system 150 that are communicatively coupled over a network 180.

The user computing system 102 can include any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected.

The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing system 102 to perform operations.

In some implementations, the user computing system 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 120 can be received from the server computing system 130 over network 180, stored in the user computing device memory 114, and then used or otherwise implemented by the one or more processors 112. In some implementations, the user computing system 102 can implement multiple parallel instances of a single machine-learned model 120 (e.g., to perform parallel machine-learned model processing across multiple instances of input data and/or detected features).

More particularly, the one or more machine-learned models 120 may include one or more detection models, one or more classification models, one or more segmentation models, one or more augmentation models, one or more generative models, one or more natural language processing models, one or more optical character recognition models, and/or one or more other machine-learned models. The one or more machine-learned models 120 can include one or more transformer models. The one or more machine-learned models 120 may include one or more neural radiance field models, one or more diffusion models, and/or one or more autoregressive language models.

The one or more machine-learned models 120 may be utilized to detect one or more object features. The detected object features may be classified and/or embedded. The classification and/or the embedding may then be utilized to perform a search to determine one or more search results. Alternatively and/or additionally, the one or more detected features may be utilized to determine an indicator (e.g., a user interface element that indicates a detected feature) is to be provided to indicate a feature has been detected. The user may then select the indicator to cause a feature classification, embedding, and/or search to be performed. In some implementations, the classification, the embedding, and/or the searching can be performed before the indicator is selected.

In some implementations, the one or more machine-learned models 120 can process image data, text data, audio data, and/or latent encoding data to generate output data that can include image data, text data, audio data, and/or latent encoding data. The one or more machine-learned models 120 may perform optical character recognition, natural language processing, image classification, object classification, text classification, audio classification, context determination, action prediction, image correction, image augmentation, text augmentation, sentiment analysis, object detection, error detection, inpainting, video stabilization, audio correction, audio augmentation, and/or data segmentation (e.g., mask based segmentation).

Additionally or alternatively, one or more machine-learned models 140 can be included in or otherwise stored and implemented by the server computing system 130 that communicates with the user computing system 102 according to a client-server relationship. For example, the machine-learned models 140 can be implemented by the server computing system 130 as a portion of a web service (e.g., a viewfinder service, a visual search service, an image processing service, an ambient computing service, and/or an overlay application service). Thus, one or more models 120 can be stored and implemented at the user computing system 102 and/or one or more models 140 can be stored and implemented at the server computing system 130.

The user computing system 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In some implementations, the user computing system can store and/or provide one or more user interfaces 124, which may be associated with one or more applications. The one or more user interfaces 124 can be configured to receive inputs and/or provide data for display (e.g., image data, text data, audio data, one or more user interface elements, an augmented-reality experience, a virtual reality experience, and/or other data for display. The user interfaces 124 may be associated with one or more other computing systems (e.g., server computing system 130 and/or third party computing system 150). The user interfaces 124 can include a viewfinder interface, a search interface, a generative model interface, a social media interface, and/or a media content gallery interface.

The user computing system 102 may include and/or receive data from one or more sensors 126. The one or more sensors 126 may be housed in a housing component that houses the one or more processors 112, the memory 114, and/or one or more hardware components, which may store, and/or cause to perform, one or more software packets. The one or more sensors 126 can include one or more image sensors (e.g., a camera), one or more lidar sensors, one or more audio sensors (e.g., a microphone), one or more inertial sensors (e.g., inertial measurement unit), one or more biological sensors (e.g., a heart rate sensor, a pulse sensor, a retinal sensor, and/or a fingerprint sensor), one or more infrared sensors, one or more location sensors (e.g., GPS), one or more touch sensors (e.g., a conductive touch sensor and/or a mechanical touch sensor), and/or one or more other sensors. The one or more sensors can be utilized to obtain data associated with a user's environment (e.g., an image of a user's environment, a recording of the environment, and/or the location of the user).

The user computing system 102 may include, and/or pe part of, a user computing device 104. The user computing device 104 may include a mobile computing device (e.g., a smartphone or tablet), a desktop computer, a laptop computer, a smart wearable, and/or a smart appliance. Additionally and/or alternatively, the user computing system may obtain from, and/or generate data with, the one or more one or more user computing devices 104. For example, a camera of a smartphone may be utilized to capture image data descriptive of the environment, and/or an overlay application of the user computing device 104 can be utilized to track and/or process the data being provided to the user. Similarly, one or more sensors associated with a smart wearable may be utilized to obtain data about a user and/or about a user's environment (e.g., image data can be obtained with a camera housed in a user's smart glasses). Additionally and/or alternatively, the data may be obtained and uploaded from other user devices that may be specialized for data obtainment or generation.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIG. 9B.

Additionally and/or alternatively, the server computing system 130 can include and/or be communicatively connected with a search engine 142 that may be utilized to crawl one or more databases (and/or resources). The search engine 142 can process data from the user computing system 102, the server computing system 130, and/or the third party computing system 150 to determine one or more search results associated with the input data. The search engine 142 may perform term based search, label based search, Boolean based searches, image search, embedding based search (e.g., nearest neighbor search), multimodal search, and/or one or more other search techniques.

The server computing system 130 may store and/or provide one or more user interfaces 144 for obtaining input data and/or providing output data to one or more users. The one or more user interfaces 144 can include one or more user interface elements, which may include input fields, navigation tools, content chips, selectable tiles, widgets, data display carousels, dynamic animation, informational pop-ups, image augmentations, text-to-speech, speech-to-text, augmented-reality, virtual-reality, feedback loops, and/or other interface elements.

The user computing system 102 and/or the server computing system 130 can train the models 120 and/or 140 via interaction with the third party computing system 150 that is communicatively coupled over the network 180. The third party computing system 150 can be separate from the server computing system 130 or can be a portion of the server computing system 130. Alternatively and/or additionally, the third party computing system 150 may be associated with one or more web resources, one or more web platforms, one or more other users, and/or one or more contexts.

The third party computing system 150 can include one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the third party computing system 150 to perform operations. In some implementations, the third party computing system 150 includes or is otherwise implemented by one or more server computing devices.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s)

can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

The user computing system may include a number of applications (e.g., applications 1 through N). Each application may include its own respective machine learning library and machine-learned model(s). For example, each application can include a machine-learned model. Example applications include a text messaging application, an email application, a dictation application, a virtual keyboard application, a browser application, etc.

Each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

The user computing system 102 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing system 100.

The central intelligence layer can communicate with a central device data layer. The central device data layer can be a centralized repository of data for the computing system 100. The central device data layer may communicate with a number of other components of the computing device, such as, for example, one or more sensors, a context manager, a device state component, and/or additional components. In some implementations, the central device data layer can communicate with each device component using an API (e.g., a private API).

Figure 9B:
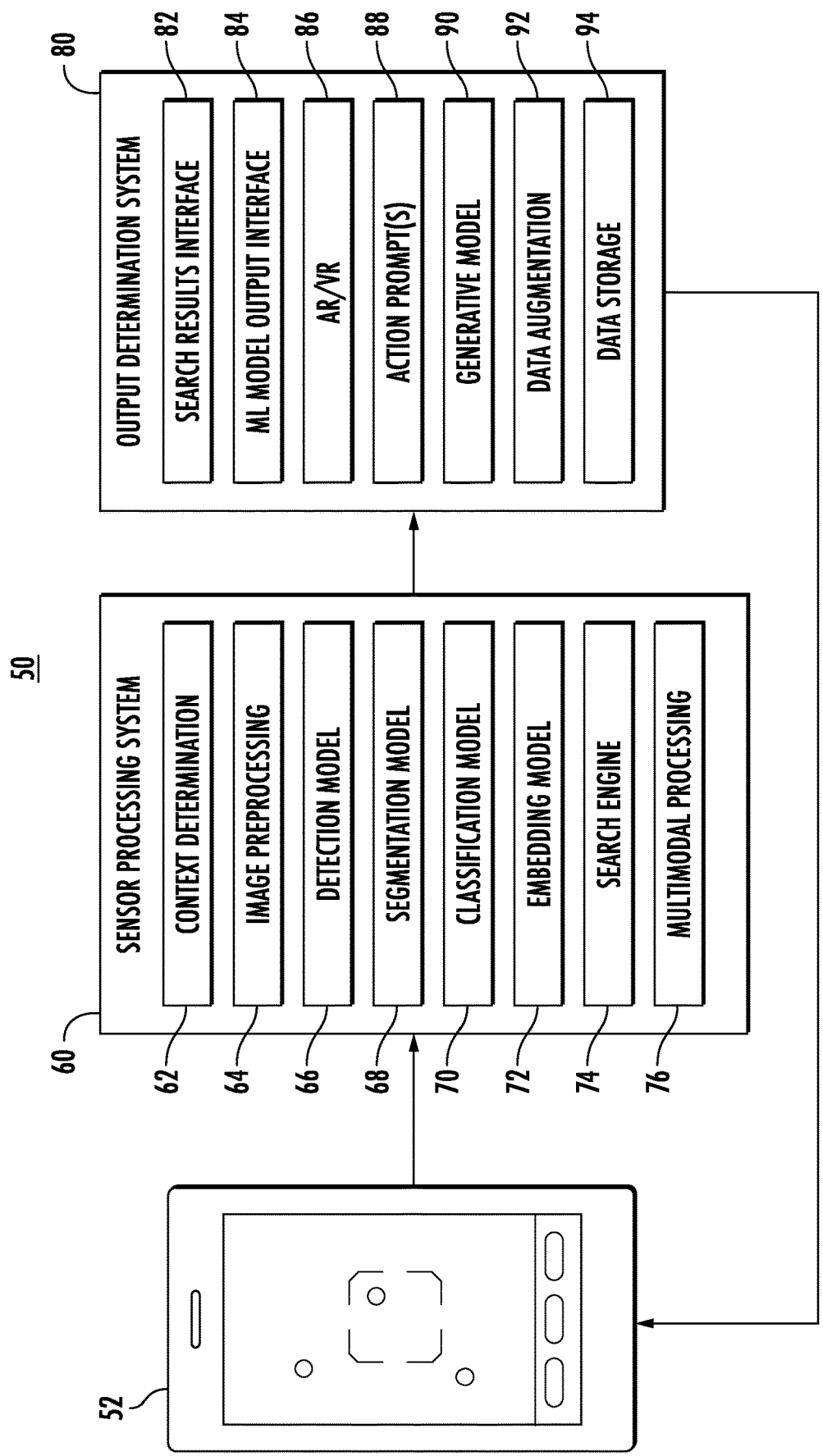
FIG. 9B depicts a block diagram of an example computing system that performs instance level scene recognition according to example embodiments of the present disclosure.

FIG. 9B depicts a block diagram of an example computing system 50 that performs instance level scene recognition according to example embodiments of the present disclosure. In particular, the example computing system 50 can include one or more computing devices 52 that can be utilized to obtain, and/or generate, one or more datasets that can be processed by a sensor processing system 60 and/or an output determination system 80 to feedback to a user that can provide information on features in the one or more obtained datasets. The one or more datasets can include image data, text data, audio data, multimodal data, latent encoding data, etc. The one or more datasets may be obtained via one or more sensors associated with the one or more computing devices 52 (e.g., one or more sensors in the computing device 52). Additionally and/or alternatively, the one or more datasets can be stored data and/or retrieved data (e.g., data retrieved from a web resource). For example, images, text, and/or other content items may be interacted with by a user. The interacted with content items can then be utilized to generate one or more determinations.

The one or more computing devices 52 can obtain, and/or generate, one or more datasets based on image capture, sensor tracking, data storage retrieval, content download (e.g., downloading an image or other content item via the internet from a web resource), and/or via one or more other techniques. The one or more datasets can be processed with a sensor processing system 60. The sensor processing system 60 may perform one or more processing techniques using one or more machine-learned models, one or more search engines, and/or one or more other processing techniques. The one or more processing techniques can be performed in any combination and/or individually. The one or more processing techniques can be performed in series and/or in parallel. In particular, the one or more datasets can be processed with a context determination block 62, which may determine a context associated with one or more content items. The context determination block 62 may identify and/or process metadata, user profile data (e.g., preferences, user search history, user browsing history, user purchase history, and/or user input data), previous interaction data, global trend data, location data, time data, and/or other data to determine a particular context associated with the user. The context can be associated with an event, a determined trend, a particular action, a particular type of data, a particular environment, and/or another context associated with the user and/or the retrieved or obtained data.

The sensor processing system 60 may include an image preprocessing block 64. The image preprocessing block 64 may be utilized to adjust one or more values of an obtained and/or received image to prepare the image to be processed by one or more machine-learned models and/or one or more search engines 74. The image preprocessing block 64 may resize the image, adjust saturation values, adjust resolution, strip and/or add metadata, and/or perform one or more other operations.

In some implementations, the sensor processing system 60 can include one or more machine-learned models, which may include a detection model 66, a segmentation model 68, a classification model 70, an embedding model 72, and/or one or more other machine-learned models. For example, the sensor processing system 60 may include one or more detection models 66 that can be utilized to detect particular features in the processed dataset. In particular, one or more images can be processed with the one or more detection models 66 to generate one or more bounding boxes associated with detected features in the one or more images.

Additionally and/or alternatively, one or more segmentation models 68 can be utilized to segment one or more portions of the dataset from the one or more datasets. For example, the one or more segmentation models 68 may utilize one or more segmentation masks (e.g., one or more segmentation masks manually generated and/or generated based on the one or more bounding boxes) to segment a portion of an image, a portion of an audio file, and/or a portion of text. The segmentation may include isolating one or more detected objects and/or removing one or more detected objects from an image.

The one or more classification models 70 can be utilized to process image data, text data, audio data, latent encoding data, multimodal data, and/or other data to generate one or more classifications. The one or more classification models 70 can include one or more image classification models, one or more object classification models, one or more text classification models, one or more audio classification models, and/or one or more other classification models. The one or more classification models 70 can process data to determine one or more classifications.

In some implementations, data may be processed with one or more embedding models 72 to generate one or more embeddings. For example, one or more images can be processed with the one or more embedding models 72 to generate one or more image embeddings in an embedding space. The one or more image embeddings may be associated with one or more image features of the one or more images. In some implementations, the one or more embedding models 72 may be configured to process multimodal data to generate multimodal embeddings. The one or more embeddings can be utilized for classification, search, and/or learning embedding space distributions.

The sensor processing system 60 may include one or more search engines 74 that can be utilized to perform one or more searches. The one or more search engines 74 may crawl one or more databases (e.g., one or more local databases, one or more global databases, one or more private databases, one or more public databases, one or more specialized databases, and/or one or more general databases) to determine one or more search results. The one or more search engines 74 may perform feature matching, text based search, embedding based search (e.g., k-nearest neighbor search), metadata based search, multimodal search, web resource search, image search, text search, and/or application search.

Additionally and/or alternatively, the sensor processing system 60 may include one or more multimodal processing blocks 76, which can be utilized to aid in the processing of multimodal data. The one or more multimodal processing blocks 76 may include generating a multimodal query and/or a multimodal embedding to be processed by one or more machine-learned models and/or one or more search engines 74.

The output(s) of the sensor processing system 60 can then be processed with an output determination system 80 to determine one or more outputs to provide to a user. The output determination system 80 may include heuristic based determinations, machine-learned model based determinations, user selection based determinations, and/or context based determinations.

The output determination system 80 may determine how and/or where to provide the one or more search results in a search results interface 82. Additionally and/or alternatively, the output determination system 80 may determine how and/or where to provide the one or more machine-learned model outputs in a machine-learned model output interface 84. In some implementations, the one or more search results and/or the one or more machine-learned model outputs may be provided for display via one or more user interface elements. The one or more user interface elements may be overlayed over displayed data. For example, one or more detection indicators may be overlayed over detected objects in a viewfinder. The one or more user interface elements may be selectable to perform one or more additional searches and/or one or more additional machine-learned model processes. In some implementations, the user interface elements may be provided as specialized user interface elements for specific applications and/or may be provided uniformly across different applications. The one or more user interface elements can include pop-up displays, interface overlays, interface tiles and/or chips, carousel interfaces, audio feedback, animations, interactive widgets, and/or other user interface elements.

Additionally and/or alternatively, data associated with the output(s) of the sensor processing system 60 may be utilized to generate and/or provide an augmented-reality experience and/or a virtual-reality experience 86. For example, the one or more obtained datasets may be processed to generate one or more augmented-reality rendering assets and/or one or more virtual-reality rendering assets, which can then be utilized to provide an augmented-reality experience and/or a virtual-reality experience 86 to a user. The augmented-reality experience may render information associated with an environment into the respective environment. Alternatively and/or additionally, objects related to the processed dataset(s) may be rendered into the user environment and/or a virtual environment. Rendering dataset generation may include training one or more neural radiance field models to learn a three-dimensional representation for one or more objects.

In some implementations, one or more action prompts 88 may be determined based on the output(s) of the sensor processing system 60. For example, a search prompt, a purchase prompt, a generate prompt, a reservation prompt, a call prompt, a redirect prompt, and/or one or more other prompts may be determined to be associated with the output(s) of the sensor processing system 60. The one or more action prompts 88 may then be provided to the user via one or more selectable user interface elements. In response to a selection of the one or more selectable user interface elements, a respective action of the respective action prompt may be performed (e.g., a search may be performed, a purchase application programming interface may be utilized, and/or another application may be opened).

In some implementations, the one or more datasets and/or the output(s) of the sensor processing system 60 may be processed with one or more generative models 90 to generate a model-generated content item that can then be provided to a user. The generation may be prompted based on a user selection and/or may be automatically performed (e.g., automatically performed based on one or more conditions, which may be associated with a threshold amount of search results not being identified).

The one or more generative models 90 can include language models (e.g., large language models and/or vision language models), image generation models (e.g., text-to-image generation models and/or image augmentation models), audio generation models, video generation models, graph generation models, and/or other data generation models (e.g., other content generation models). The one or more generative models 90 can include one or more transformer models, one or more convolutional neural networks, one or more recurrent neural networks, one or more feedforward neural networks, one or more generative adversarial networks, one or more self-attention models, one or more embedding models, one or more encoders, one or more decoders, and/or one or more other models. In some implementations, the one or more generative models 90 can include one or more autoregressive models (e.g., a machine-learned model trained to generate predictive values based on previous behavior data) and/or one or more diffusion models (e.g., a machine-learned model trained to generate predicted data based on generating and processing distribution data associated with the input data).

The one or more generative models 90 can be trained to process input data and generate model-generated content items, which may include a plurality of predicted words, pixels, signals, and/or other data. The model-generated content items may include novel content items that are not the same as any pre-existing work. The one or more generative models 90 can leverage learned representations, sequences, and/or probability distributions to generate the content items, which may include phrases, storylines, settings, objects, characters, beats, lyrics, and/or other aspects that are not included in pre-existing content items.

The one or more generative models 90 may include a vision language model. The vision language model can be trained, tuned, and/or configured to process image data and/or text data to generate a natural language output. The vision language model may leverage a pre-trained large language model (e.g., a large autoregressive language model) with one or more encoders (e.g., one or more image encoders and/or one or more text encoders) to provide detailed natural language outputs that emulate natural language composed by a human.

The vision language model may be utilized for zero-shot image classification, few shot image classification, image captioning, multimodal query distillation, multimodal question and answering, and/or may be tuned and/or trained for a plurality of different tasks. The vision language model can perform visual question answering, image caption generation, feature detection (e.g., content monitoring (e.g. for inappropriate content)), object detection, scene recognition, and/or other tasks.

The vision language model may leverage a pre-trained language model that may then be tuned for multimodality. Training and/or tuning of the vision language model can include image-text matching, masked-language modeling, multimodal fusing with cross attention, contrastive learning, prefix language model training, and/or other training techniques. For example, the vision language model may be trained to process an image to generate predicted text that is similar to ground truth text data (e.g., a ground truth caption for the image). In some implementations, the vision language model may be trained to replace masked tokens of a natural language template with textual tokens descriptive of features depicted in an input image. Alternatively and/or additionally, the training, tuning, and/or model inference may include multi-layer concatenation of visual and textual embedding features. In some implementations, the vision language model may be trained and/or tuned via jointly learning image embedding and text embedding generation, which may include training and/or tuning a system to map embeddings to a joint feature embedding space that maps text features and image features into a shared embedding space. The joint training may include image-text pair parallel embedding and/or may include triplet training. In some implementations, the images may be utilized and/or processed as prefixes to the language model.

The output determination system 80 may process the one or more datasets and/or the output(s) of the sensor processing system 60 with a data augmentation block 92 to generate augmented data. For example, one or more images can be processed with the data augmentation block 92 to generate one or more augmented images. The data augmentation can include data correction, data cropping, the removal of one or more features, the addition of one or more features, a resolution adjustment, a lighting adjustment, a saturation adjustment, and/or other augmentation.

In some implementations, the one or more datasets and/or the output(s) of the sensor processing system 60 may be stored based on a data storage block 94 determination.

The output(s) of the output determination system 80 can then be provided to a user via one or more output components of the user computing device 52. For example, one or more user interface elements associated with the one or more outputs can be provided for display via a visual display of the user computing device 52.

The processes may be performed iteratively and/or continuously. One or more user inputs to the provided user interface elements may condition and/or affect successive processing loops.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, the method comprising:
   obtaining, by a computing system comprising one or more processors, image data, wherein the image data comprises an input image;
   processing, by the computing system, the input image with an object recognition model to generate a fine-grained object recognition output, wherein the fine-grained object recognition output is descriptive of identification details for an object depicted in the input image;
   processing, by the computing system, the input image with a vision language model to generate a language output, wherein the language output comprises a set of predicted words predicted to be descriptive of the input image, wherein the set of predicted words comprise a coarse-grained term descriptive of predicted identification of the object depicted in the input image; and
   processing, by the computing system, the fine-grained object recognition output and the language output to generate an augmented language output, wherein the augmented language output comprises the set of predicted words with the coarse-grained term replaced with the fine-grained object recognition output.

2. The method of claim 1, wherein processing, by the computing system, the input image with the object recognition model to generate the fine-grained object recognition output comprises:
   detecting the object in the input image;
   generating an object embedding;
   determining an image cluster associated with the object embedding; and
   processing web resources associated with the image cluster to determine identification details for the object.

3. The method of claim 2, wherein generating the object embedding comprises:
   generating a bounding box associated with a position of the object within the input image;
   generating an image segment based on the bounding box; and
   processing the image segment with an embedding model to generate the object embedding.

4. The method of claim 1, wherein processing, by the computing system, the fine-grained object recognition output and the language output to generate the augmented language output comprises:
   processing, by the computing system, the language output to determine a plurality of text tokens associated with features in the input image;
   determining, by the computing system, a particular token of the plurality of text tokens is associated with the object; and
   replacing, by the computing system, the particular token with the fine-grained object recognition output.

5. The method of claim 4, wherein determining, by the computing system, the particular token of the plurality of text tokens is associated with the object comprises:
   processing, by the computing system, the fine-grained object recognition output with an embedding model to generate an instance-level embedding;
   processing, by the computing system, the plurality of text tokens with the embedding model to generate a plurality of token embeddings; and
   determining, by the computing system, the instance-level embedding is associated with a particular embedding associated with the particular token.

6. The method of claim 1, further comprising:
   processing, by the computing system, the augmented language output with a second language model to generate a natural language response to the augmented language output.

7. The method of claim 6, wherein the natural language response comprises additional information associated with the augmented language output.

8. The method of claim 1, wherein the coarse-grained term comprises an object type, and wherein the fine-grained object recognition output comprises a detailed identification of the object.

9. The method of claim 1, further comprising:
   providing, by the computing system, the augmented language output in an augmented-reality experience.

10. The method of claim 9, wherein the augmented-reality experience comprises the augmented language output overlayed over a live video feed of an environment.

11. A computing system for image captioning, the system comprising:
   one or more processors; and
   one or more non-transitory computer-readable media that collectively store instructions that, when executed by the one or more processors, cause the computing system to perform operations, the operations comprising:

obtaining image data, wherein the image data comprises an input image;

processing the input image with an object recognition model to generate an object recognition output, wherein the object recognition output is descriptive of identification details for an object depicted in the input image;

processing the input image with a vision language model to generate a language output, wherein the language output comprises a set of words predicted to be descriptive of the input image, wherein the set of words comprise a term descriptive of predicted identification of the object depicted in the input image; and processing the object recognition output and the language output with the vision language model to generate an augmented language output, wherein the augmented language output comprises the set of words with the term replaced with the object recognition output.

12. The system of claim 1, wherein the input image is descriptive of the object in an environment with one or more additional objects, wherein the object recognition output is associated with the object, and wherein the language output is associated with the object and the environment with the one or more additional objects.

13. The system of claim 11, wherein the vision language model was trained on a training dataset comprising a plurality of image-caption pairs, wherein the plurality of image-caption pairs comprise a plurality of training images and a plurality of respective captions associated with the plurality of training images.

14. The system of claim 11, wherein the input image is processed with the object recognition model and the vision language model in parallel to perform parallel determination of the object recognition output and the language output, and wherein the vision language model comprises one or more text encoders, one or more image encoders, and one or more decoders.

15. The system of claim 11, wherein the object recognition model comprises one or more classification models.

16. The system of claim 11, wherein the object recognition output comprises an instance-level object recognition associated with the object, and wherein the language output comprises a scene understanding associated with the input image.

17. One or more non-transitory computer-readable media that collectively store instructions that, when executed by one or more computing devices, cause the one or more computing devices to perform operations, the operations comprising:

obtaining image data, wherein the image data comprises an input image;

processing the input image to determine an object recognition output, wherein the object recognition output is descriptive of identification details for an object depicted in the input image;

processing the input image with a vision language model to generate a language output, wherein the language output comprises a set of words predicted to be descriptive of the input image, wherein the set of words comprise a term descriptive of predicted identification of the object depicted in the input image;

processing the object recognition output and the language output to generate an augmented language output, wherein the augmented language output comprises the set of words with the term replaced with the object recognition output; and determining one or more search results associated with the augmented language output, wherein the one or more search results are associated with one or more web resources.

18. The one or more non-transitory computer-readable media of claim 17, wherein processing the input image to determine the object recognition output comprises processing the input image with a search engine to determine text data descriptive of an object identification.

19. The one or more non-transitory computer-readable media of claim 17, wherein processing the input image to determine the object recognition output comprises:

processing the input image with an embedding model to generate an image embedding;

determining one or more object labels based on the image embedding, wherein the one or more object labels comprise the identification details for the object depicted in the input image.

20. The one or more non-transitory computer-readable media of claim 17, wherein determining the one or more search results associated with the augmented language output comprises determining a plurality of search results are responsive to a search query comprising the augmented language output; and wherein the operations further comprise: providing the plurality of search results for display.

* * * * *